(12) United States Patent
Howard

(10) Patent No.: US 8,090,811 B2
(45) Date of Patent: *Jan. 3, 2012

(54) SERVICE PROVIDER FOR EMBEDDED DEVICES USING A MESSAGE STORE

(75) Inventor: Michael L. Howard, Sandy, UT (US)

(73) Assignee: Panasonic Electric Works Co., Ltd., Osaka (JP)

( * ) Notice: Subject to any disclaimer, the term of this patent is extended or adjusted under 35 U.S.C. 154(b) by 1110 days.

This patent is subject to a terminal disclaimer.

(21) Appl. No.: 11/132,873

(22) Filed: May 19, 2005

(65) Prior Publication Data

US 2005/0210034 A1 Sep. 22, 2005

Related U.S. Application Data

(63) Continuation-in-part of application No. 10/431,906, filed on May 8, 2003, which is a continuation of application No. 09/587,929, filed on Jun. 6, 2000, now Pat. No. 6,601,086.

(51) Int. Cl.
G06F 15/173 (2006.01)
G06F 15/16 (2006.01)
(52) U.S. Cl. .............................. 709/223; 709/203
(58) Field of Classification Search .................. 709/245, 709/203
See application file for complete search history.

(56) References Cited

U.S. PATENT DOCUMENTS

| | | | |
|---|---|---|---|
| 5,638,450 A | 6/1997 | Robson | |
| 5,787,259 A | 7/1998 | Haroun et al. | |
| 5,898,839 A | 4/1999 | Berteau | |
| 5,951,644 A * | 9/1999 | Creemer | 709/229 |
| 5,956,487 A | 9/1999 | Venkatraman et al. | |
| 6,006,251 A | 12/1999 | Toyouchi et al. | |
| 6,032,202 A | 2/2000 | Lea et al. | |

(Continued)

FOREIGN PATENT DOCUMENTS

EP 0 772 107 5/1997

(Continued)

OTHER PUBLICATIONS

"Bringing the Internet to all Electronic Devices," Michael Howard and Chris S. Sontag, Proceedings of the Embedded Systems Workshop, 1999, pp. 1-13.

(Continued)

Primary Examiner — Minh-Chau Nguyen
(74) Attorney, Agent, or Firm — Austin Rapp & Hardman

(57) ABSTRACT

A service provider for embedded devices is disclosed for controlling, monitoring and/or updating embedded devices. The service provider includes a computer having communications hardware for communicating over a computer network. The computer also includes a storage device and a processor. The computer network communication module is also configured to communicate via the computer network with a message store and transmit component, wherein the message store and transmit component is capable of communicating with one or more embedded devices through the computer network. A database of service information obtained from the computer network is also added to the service provider. This database of service information is available to the embedded devices through the message store and transmit component. In general, communications between the service provider and the embedded device occur by having information or data be sent from the provider to the message store and transmit component and then, in turn, this information or data is sent by the message store and transmit component to the embedded device.

37 Claims, 12 Drawing Sheets

U.S. PATENT DOCUMENTS

| | | | |
|---|---|---|---|
| 6,052,750 A | 4/2000 | Lea | |
| 6,073,168 A * | 6/2000 | Mighdoll et al. | 709/217 |
| 6,085,236 A | 7/2000 | Lea | |
| 6,085,244 A * | 7/2000 | Wookey | 709/224 |
| 6,139,177 A * | 10/2000 | Venkatraman et al. | 715/234 |
| 6,151,643 A * | 11/2000 | Cheng et al. | 710/36 |
| 6,160,796 A | 12/2000 | Zou | |
| 6,185,566 B1 * | 2/2001 | Adams et al. | 707/10 |
| 6,199,136 B1 | 3/2001 | Shteyn | |
| 6,230,199 B1 * | 5/2001 | Revashetti et al. | 709/224 |
| 6,345,288 B1 * | 2/2002 | Reed et al. | 709/201 |
| 6,363,417 B1 * | 3/2002 | Howard et al. | 709/217 |
| 6,363,434 B1 * | 3/2002 | Eytchison | 709/245 |
| 6,912,580 B1 * | 6/2005 | Kanevsky et al. | 709/228 |
| 6,934,755 B1 * | 8/2005 | Saulpaugh et al. | 709/226 |
| 7,216,091 B1 * | 5/2007 | Blandina et al. | 705/26 |
| 7,281,040 B1 * | 10/2007 | Ly | 709/224 |

FOREIGN PATENT DOCUMENTS

| | | |
|---|---|---|
| WO | WO-00/04427 | 1/2000 |

OTHER PUBLICATIONS

"Web-Based Device Monitoring and Control," Rodney Snell, Proceedings of the Annual Embedded Systems Conference, Mar. 1, 1999, pp. 283-294.

"Web Implemented Irrigation System," Chris Sontag, Circuit Cellar, Nov. 1998, pp. 26-31.

* cited by examiner

SERVICE PROVIDER FOR EMBEDDED DEVICES USING A MESSAGE STORE

CROSS-REFERENCE TO RELATED APPLICATIONS

This application is a continuation-in-part of U.S. patent application Ser. No. 10/431,906 filed May 8, 2003, which is a continuation of U.S. patent application Ser. No. 09/587,929, filed Jun. 6, 2000, now U.S. Pat. No. 6,601,086 entitled "Service Provider For Providing Data, Applications And Services To Embedded Devices And For Facilitating Control And Monitoring Of Embedded Devices." These prior applications are incorporated herein by reference.

TECHNICAL FIELD

This invention relates to computer software and, more particularly, to novel systems and methods for providing access and services to embedded devices through a computer network.

BACKGROUND

In recent years there has been a great increase in the amount of computer technology that is involved in daily life. In today's world, computer technology is involved in many aspects of a person's day. Many devices being used today by consumers have a small computer inside of the device. These small computers come in varying sizes and degrees of sophistication. These small computers include everything from one microcontroller to a fully-functional complete computer system. For example, these small computers may be a one-chip computer, such as a microcontroller, a one-board type of computer, such as a controller, a typical desktop computer, such as an IBM-PC compatible, etc.

The small computers, (which can be rather large computers depending on the particular need which is being met by the computer), almost always have one or more processors at the heart of the computer. The processor(s) usually are interconnected to different external inputs and outputs and function to manage the particular device. For example, a processor in a vending machine for soda pop may be connected to the buttons used to select the pop, to the switch that allows a pop to drop down to a user, and to lights to indicate that the machine does not have any more pop of a particular variety.

Computer technology is involved in many aspects of today's world. Many appliances, devices, etc., include one or more small computers. For example, refrigerators, telephones, typewriters, automobiles, vending machines, and many different types of industrial equipment all have small computers, or processors, inside of them. Computer software runs the processors of these computers and tells the processors what to do to carry out certain tasks. For example, the computer software running on a processor in a vending machine may cause a soda pop to drop to a user when the correct change has been entered by a user.

These types of small computers that are a part of a device, appliance, tool, etc., are often referred to as embedded systems. The term "embedded system" usually refers to computer hardware and software that is part of a larger system. Embedded systems usually do not have typical input and output devices such as a keyboard, mouse, and/or monitor. Generally, at the heart of each embedded system is one or more processor(s).

Typically the embedded systems used today with various appliances, devices, etc., do not have a lot of storage capability. As a result, the amount of data that can be stored on the embedded systems is limited. With only limited storage, an embedded system may not have as many features and capabilities as it could have if it had more available storage. Memory is often conserved in these embedded systems that monitor, control and otherwise use electronic devices.

Almost all desktop computer systems include memory management capabilities at the processor level (hardware), firmware level (the software embedded into the hardware), and at the operating system level. However, in many embedded devices, these types of memory management capabilities are not available. For example, many of the embedded environments include an 8-bit or 16-bit microcontroller, where no substantial operating system or memory management features are present. In these types of environments, any program code is typically developed and loaded onto the embedded device by the manufacturer before the device is shipped, after which software upgrades are rarely if ever even contemplated.

Because many embedded devices do not have extensive memory management capabilities, it is often difficult to easily upgrade the software, upgrade modules, upgrade components and/or to add new software, new components, new modules, new features, new extensions, etc. Some embedded systems have been connected to computer networks to allow some communication between the embedded system and a larger computer system. However, because embedded systems are often not equipped with the functionality to effectively and efficiently communicate with other computer systems, the communication capability is usually limited. In addition, the means for communicating with embedded systems is often a slower type of communication pathway and, accordingly, only limited amounts of data are passed to and from the embedded systems.

Because of the constrained memory resources on the embedded systems and because of the typically limited communications means, often only limited interaction from a computer network with the embedded system is available. This interaction is often of limited use because of the difficulty in communicating with the different parts of the embedded system.

As mentioned, it is often difficult to easily upgrade the software of an embedded system once it is out in the field and in use. As a result, older embedded systems typically have older versions of software, while newer embedded systems have newer software. If a computer system on a computer network needed to communicate with a plurality of embedded systems or devices, it would need to be programmed to communicate with each particular version of software that may be installed in embedded systems. Programming and maintaining a computer on a computer network to communicate with many different versions of software of embedded systems would be burdensome and difficult for many companies and/or manufacturers whose main focus is not to simply service embedded systems.

As computer technology and the use of embedded systems continue to expand and be used in additional areas, there will be an increasing need to be able to communicate with and interact with these embedded systems. In addition, there will be ever-increasing needs in the areas of controlling, monitoring, updating and otherwise servicing embedded systems and/or embedded devices.

BRIEF DESCRIPTION OF THE DRAWINGS

Exemplary embodiments of the invention will become more fully apparent from the following description and appended claims, taken in conjunction with the accompanying drawings. Understanding that these drawings depict only exemplary embodiments and are, therefore, not to be considered limiting of the invention's scope, the exemplary embodiments of the invention will be described with additional specificity and detail through use of the accompanying drawings in which:

DETAILED DESCRIPTION

Figure 1:
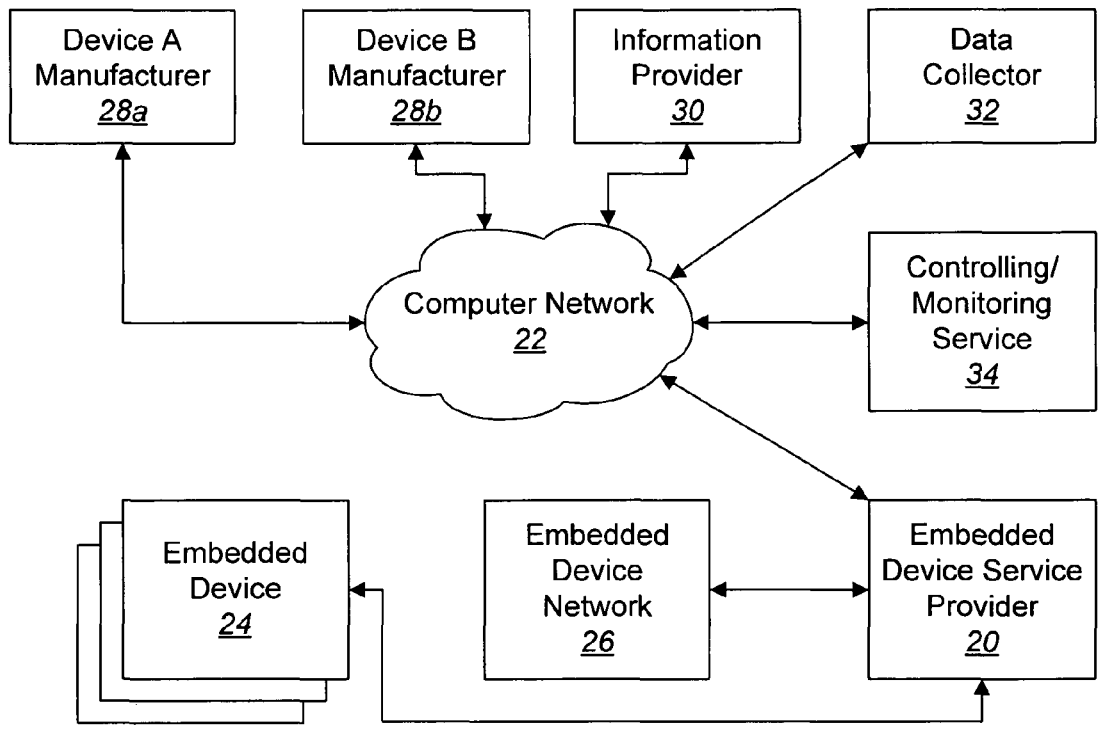
FIG. 1 is block diagram illustrating the major components typically utilized in the use of a service provider for embedded devices and the embodiments disclosed herein.

In accordance with the embodiments broadly described herein, a service provider for embedded devices is disclosed for controlling, monitoring and/or updating embedded devices. The service provider includes a computer having communications hardware for communicating over a computer network. The computer also includes at least one storage device and at least one processor. The service provider further includes a computer network communications module for communicating with computers via the computer network. The computer network communication module is also configured to communicate via the computer network with a message store and transmit component. In turn, this message store and transmit component is capable of communicating with one or more embedded devices through the computer network. A database of service information is also added to the service provider. This database of service information is available to the embedded devices through the message store and transmit component. Also, the service provider has a database interface module for accessing the information in the embedded device information database.

Additional embodiments may also be constructed in which the service provider includes an information collection manager for searching the computer network and for accessing and obtaining updated information from the computer network relating to the embedded devices. Further embodiments may have the provider include an embedded device communications module that handles the communications with the message store and transmit component.

Yet additional embodiments may be constructed in which the provider controls an embedded device by periodically sending control data to computer program code loaded on the embedded device. This control data will likely affect operation of the embedded device. Usually this periodic sending of control data is based on the schedule data that is found in the provider. In some embodiments, this transmission of control data is accomplished by sending the data from the provider to the message store and transmit component and then, in turn, sending the data from the message store and transmit component to the embedded device.

A method for using/practicing the embodiments disclosed herein may be accomplished by first providing electronic communications between the service provider for embedded devices and a communications network. Once this communication is established, a communication is received from the message store and transmit component. In general, this communication from the message store and transmit component contains information that was previously sent to the message store and transmit component by an embedded device. Next, the provider undertakes to identify the embedded device that sent the information to the message store and transmit component. Once the embedded device has been identified, the embedded device information database is accessed by the provider and a communication is sent from the provider to the message store and transmit component. This sent message will contain information (such as control data, updated computer code, etc.) that may be later sent by the message store and transmit component to the embedded device. Lastly, information regarding this transaction may then be stored by the provider in the storage database for future reference.

A system is also disclosed for providing services to embedded devices where the system comprises a plurality of service providers for embedded devices. In general, the at least one of the service providers has a computer network communications module for communicating with computers via the computer network. This computer network communication module is also configured to communicate via the computer network with a message store and transmit component. Likewise, the message store and transmit component is capable of communicating with one or more embedded devices through the computer network. The system also includes a central provider in electronic communication with the plurality of service providers for embedded devices. The central provider operates to coordinate communications between embedded devices and service providers for embedded devices and to coordinate disseminating the updated information to embedded devices.

It will be readily understood that the components of the embodiments, as generally described and illustrated in the Figures herein, could be arranged and designed in a wide variety of different configurations. Thus, the following more detailed description of the embodiments of the system and method, as represented in FIGS. 1 through 16, is not intended to limit the scope of the invention, as claimed, but is merely representative of embodiments of the invention.

The present embodiments will be best understood by reference to the drawings, wherein like parts are designated by like numerals throughout.

A service provider 20 for embedded devices is disclosed as including a computer having communications hardware for communicating over a computer network 22. The computer also includes at least one storage device and at least one processor. The service provider 20 further includes a database of embedded device information and/or a database of service information obtained from the computer network 22. An embedded device communications module is used by the service provider 20 to communicate with a number of embedded devices 24. The service provider 20 further includes a computer network communications module for communicating with computers via the computer network 22. In addition, the service provider 20 has a database interface module for accessing the information in the database(s).

The service provider 20 may also include an information collection manager for searching the computer network 22 and for accessing and obtaining updated information from the computer network 22 relating to the embedded devices 24. The provider 20 may link certain information in the embedded device information database to certain updated information. Among the items that may be stored in the embedded device information database there may be a plurality of capabilities tables.

In communicating with an embedded device 24, the embedded device communications module may receive at least one message from the embedded device 24 that includes an embedded device identifier. The communications with one or more embedded devices 24 may be scheduled through the use of schedule data. Schedule data may include embedded device identifications and routing data. The schedule data may be used to control monitoring of the embedded devices 24.

Control of one or more embedded devices 24 may be provided by the service provider 20 through the periodic sending of control data to computer program code loaded on the embedded device 24 to affect operation of the embedded device 24. The periodic sending may be based on the schedule data. In addition, the provider 20 may cause computer program code on an embedded device 24 to be updated by obtaining updated computer program code via the computer network 22 and by notifying the embedded device 24 of an available update and by further sending the updated computer program code to the embedded device 24.

The provider 20 may monitor an embedded device 24 via the embedded device communications module by periodically obtaining interface data from computer program code loaded on the embedded device 24. The provider 20 may store the interface data on the storage device. Further, the provider 20 may aggregate monitoring data created from the interface data received. This monitoring data may be provided to a requestor through the computer network 22.

The provider 20 may communicate with an embedded device 24 via the embedded device communications module to obtain from computer program code loaded on the embedded device 24 a device description. The device description may comprise a list of functions, variables, data types, events and files.

A method practiced in accordance with embodiments herein may include the steps of providing electronic communications between the service provider 20 for embedded devices 24 and a telecommunications network 22, receiving a message from an embedded device 24, identifying the embedded device 24 through use of the message received, accessing the embedded device information database, sending a transmit message to the embedded device 24, and storing device information descriptive of a transaction.

The method may also include the steps of collecting updated information from a computer network 22 relating to embedded devices 24 and linking certain information in the embedded device information database to certain updated information. In addition, the method may include the step of parsing the message from the embedded device 24 to obtain an embedded device identifier.

A system is also disclosed for providing services to embedded devices 24 where the system comprises a plurality of service providers 20 for embedded devices 24. The system also includes a central provider in electronic communication with the plurality of service providers 20 for embedded devices 24. The central provider operates to coordinate communications between embedded devices 24 and service providers 20 for embedded devices 24. The central provider may also coordinate collecting updated information from the computer network 22 relating to embedded devices 24 and coordinate disseminating the updated information to embedded devices 24.

Of course, it will be appreciated by those skilled in the art that the method may be embodied in executable instructions stored on a computer-readable medium.

FIG. 1 is block diagram illustrating the major components typically utilized in the use of a service provider 20 for embedded devices 24 and the embodiments disclosed herein. In the present embodiments, the service provider 20 is in electronic communication with one or more embedded devices 24 (or embedded systems 24) and may also be in electronic communication with one or more embedded device networks 26. These electronic communications may be direct dial up connections, connections through a LAN, a WAN, an intranet, the Internet or any other means of electronic communication. As shown, a computer network 22 may also provide electronic communications between the service provider 20 and a number of other components. In the embodiments herein, the computer network 22 includes the Internet.

Device manufacturers 28 may be in communication with the computer network 22. For example, Device A Manufacturer 28*a* and Device B Manufacturer 28*b*, as illustrated, may be in electronic communication with the computer network 22. Device manufacturers 28 may be manufacturers of the embedded devices 24, the processors used in the embedded devices 24, the developers of the software used by the embedded devices 24 and/or processors, etc. Some examples of companies that would be typical device manufacturers 28 are Motorola, Intel, AMD, Nokia, Hewlett Packard, Microchip, Siemens, etc. These examples are only meant to be illustrative and are not meant to limit the broad scope of what may be considered a device manufacturer 28.

Device manufacturers 28 are often aware of any device upgrades, whether hardware or software, any device problems, etc. The service provider 20 may obtain information from device manufacturers 28 to be used to update, monitor, control or otherwise service embedded devices 24.

Information providers 30 may also be in electronic communication with the computer network 22. Information providers 30 are any providers of information that may be useful in some way by the embedded devices 24 and/or by the embedded device service provider 20. For example, weather information may be provided by a web site on the World Wide Web portion of the Internet. This provider of weather information would be within the scope of an information provider 30. In addition, the current date and time may also be provided by an information provider 30. Another information provider 30 may provide map information, while another may provide consumer product identification information.

A data collector 32 may also be in electronic communication with the computer network 22. A data collector 32 is any entity that is engaged in collecting data from embedded devices 24. A data collector 32 may also be referred to as a requester in that it requests data from embedded devices 24. In embodiments herein, the service provider 20 facilitates the collection of data from the embedded devices 24 by communicating with the embedded devices 24, obtaining data from the devices, and by, at some point, providing this data or related information to the data collector 32. An example of a data collector 32 would be a utility company with a need of gathering and totaling usage data from meters that measure usage by different consumers. Embedded devices 24 implementing these meters, or in electronic communication with these meters, may read the usage data and provide it to the service provider 20. The service provider 20 may then provide the usage data obtained to the data collector 32. Many other data collection needs may be met through a data collector 32. For example, collecting data of what consumer items were purchased, their current status and/or where consumer item is may be useful information that may be gathered by a data collector 32.

Services 34 that control and/or monitor embedded devices 24 and/or embedded networks 26 may also be in electronic communication with the computer network 22. A controlling/monitoring service 34 would be any service that provides control for and/or provides monitoring of embedded devices 24. In some circumstances, a data collector 32 is similar to a service providing monitoring. However, a controlling and/or monitoring service 34 provides a more active role than a data collector 32. In some embodiments, a monitoring service 34 monitors one or more embedded devices 24 on a periodic basis to ascertain whether the devices 24 are operating within normal parameters. In certain embodiments, a controlling service 34 provides control for one or more embedded devices 24 by sending control data to the one or more embedded devices 24. For example, a certain set of embedded devices 24 may require weather information for proper operation (for example, a sprinkler controller) and a controlling service 34 may provide control data based on weather information and location. For example, the controlling service 34 may send commands to certain embedded device sprinkler controllers telling the controller not to water.

Figure 2:
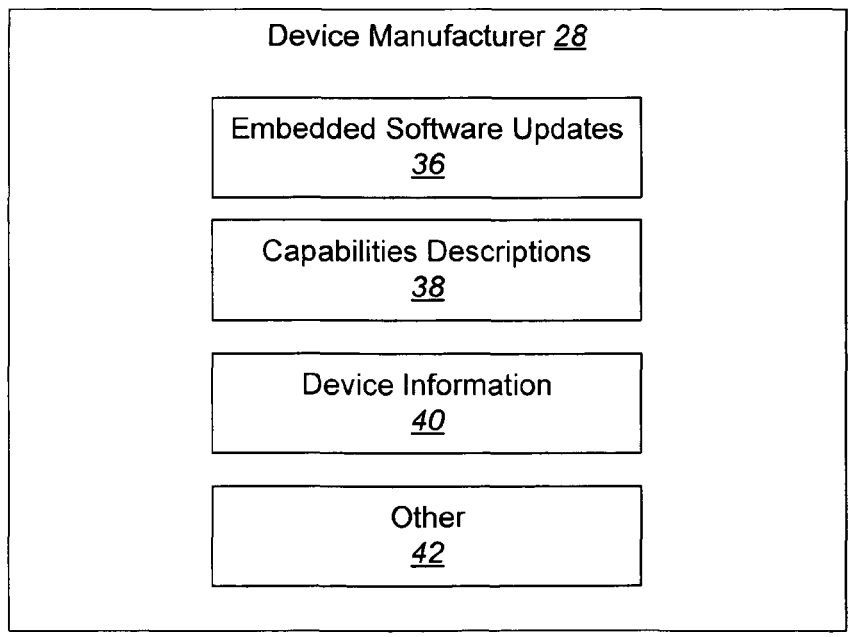
FIG. 2 is a block diagram of data that may be available from a device manufacturer.

FIG. 2 is a block diagram of data that may be available from a device manufacturer 28. Device manufacturers 28 may be aware and have copies of embedded software updates 36. For example, a newer version of the software running on a microcontroller in an embedded device 24 may be available from the device manufacturer 28. The device manufacturer 28 may make this updated software 36 available.

Device manufacturers 28 may also be aware of the various capabilities of the devices 24 that they manufacture. In this regard, the device manufacturers 28 may make capabilities descriptions 38 for their devices 24 available. Basic information about the embedded device 24, its characteristics and capabilities are useful to those who may wish to somehow interact with it. Such basic information may be stored by the device manufacturer 28 in a capabilities description 38 or capabilities table 38. The capabilities table 38 may be stored as a file. Those skilled in the art will realize that there are a variety of ways to store basic capabilities of an embedded device 24 and its connected input and/or output devices. Table 1 contains pseudocode illustrating what types of information may be stored in a capabilities description 38 or table 38.

TABLE 1

| | |
|---|---|
| 1A | Interfaces supported |
| 1B | byte ordering type |
| 1C | device identification |
| 1D | device address |
| 1E | software version |
| 1F | communication protocol version |
| 1G | maximum communication packet size |
| 1H | nonvolatile storage flag (indicates yes or no) |
| 1I | nonvolatile storage size, starting address |
| 1J | static file system flag |
| 1K | dynamic file system flag |

As illustrated in Table 1, the capabilities table 38 may include an indication of what interface definitions (1A) the embedded device 24 supports. The interface definitions (1A) field and its use will be more fully described herein. The capabilities table 38 may also indicate the byte order type shown at line (1B). This byte ordering type (1B) may indicate whether the embedded device is big endian or little endian. The table 38 may also indicate what the device identification, shown at line (1C), is for that particular embedded device 24. The device address, shown at line (1D), if any, may also be stored in the capabilities table 38.

For compatibility purposes, the version numbers, shown at line (1E), for the software being used may also be stored. Similarly the communication protocol version numbers, shown at line (1F), may also be stored. Particulars about the communication may also be stored. For example, as shown in Table 1, the maximum communication packet size, shown at line (1G), may be stored.

A nonvolatile storage flag shown at line (1H) may indicate whether there is nonvolatile storage accessible by the embedded device 24. Pertinent information about the nonvolatile storage may also be stored, such as the nonvolatile storage size and its starting address, shown at line (1I). A static file system flag, shown at line (1J), may indicate whether there is a static file system. Similarly, a dynamic file system flag, shown at line (1K), may indicate whether there is a dynamic file system.

The capabilities table 38 is useful in that developers or engineers can obtain the capabilities table 38 and ascertain the characteristics and capabilities of the embedded device 24.

Device manufacturers 28 may also have other device information 40. For example, if certain embedded devices 24 were known to fail after a period of time, the device manufacturer 28 may have this information. In addition, a manufacturer 28 may be aware of certain parts of an embedded device 24 that are known to wear over time and cause erroneous data. Device manufacturers 28 would probably also be aware of embedded device 24 recalls. As will be appreciated by those skilled in the art, device manufacturers 28 may be aware of a number of other items 42 or things that may be relevant to an embedded device 24. The device manufacturers 28 may make this other information 42 available.

Figure 3:
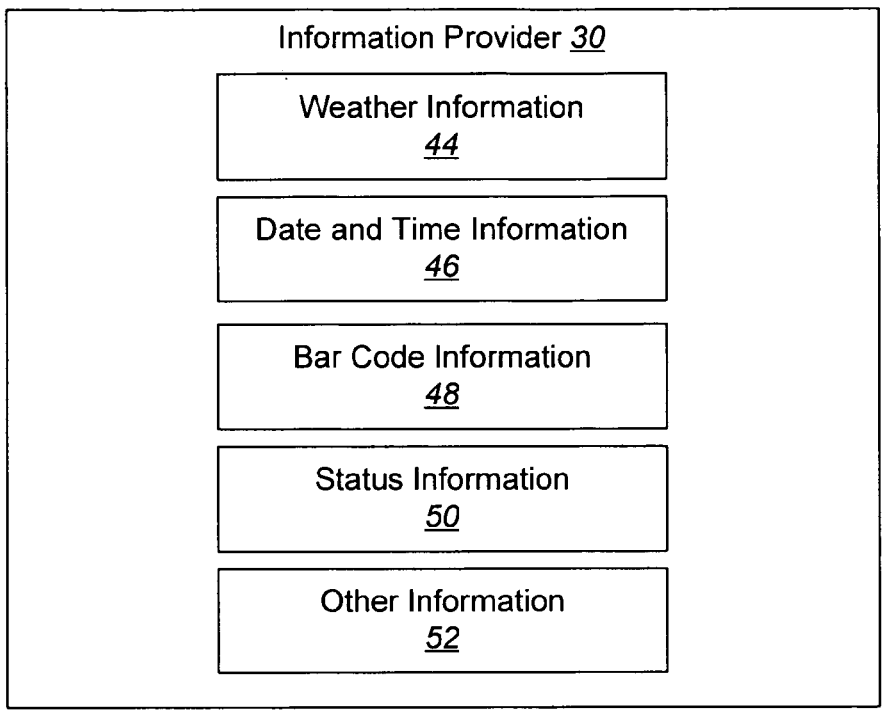
FIG. 3 is a block diagram of data or information that may be available from an information provider.

FIG. 3 is a block diagram of data or information that may be available from an information provider 30. Information providers 30 are entities that provide any type of data or information. Typically the data or information is provided in a form of electronic communication. FIG. 3 illustrates examples of the data that may be provided by an information provider 30. Weather information 44 may be provided. Date and time information 46 may be provided. Bar code information 48, such as what consumer product is identified by a particular bar code, may also be provided. Status information 50 about a particular item, thing or place may also be provided. Of course, those skilled in the art will appreciate that many other types of information 52 may also be provided.

Figure 4:
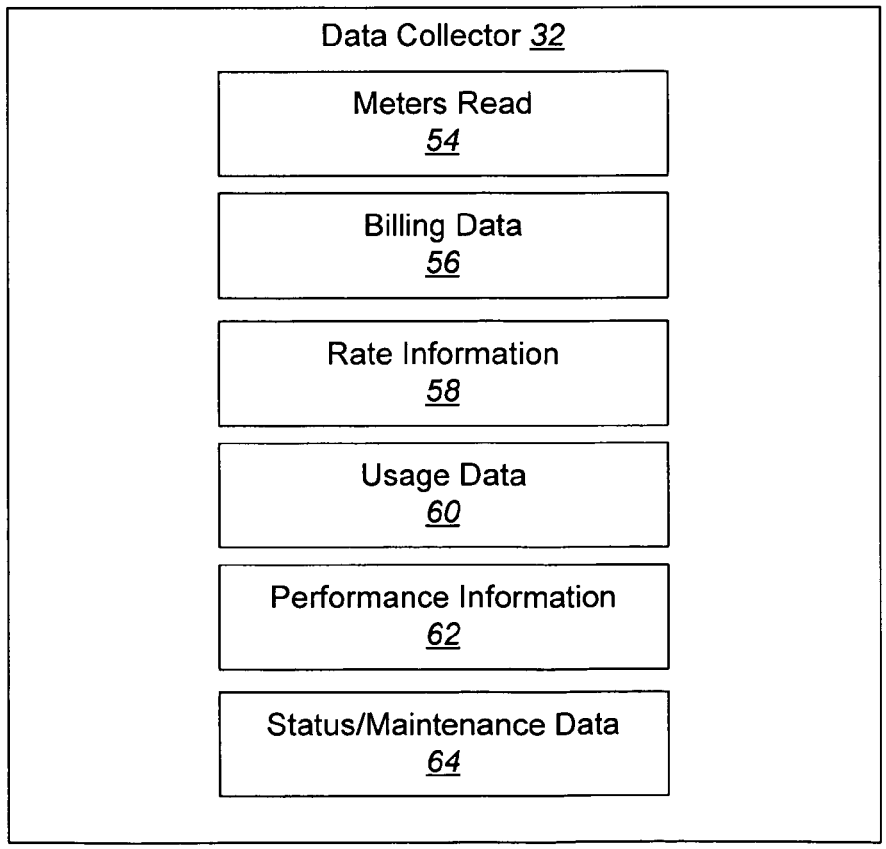
FIG. 4 is a block diagram of data or information that may be collected by a data collector.

FIG. 4 is a block diagram of data or information that may be collected by a data collector 32 or requestor. Data collectors 32 are entities that collect and/or gather information or data. Typically the data or information is transmitted to the data collector 32 in electronic form. The items shown in FIG. 4 illustrate examples of the data that may be collected by a data collector 32 concerned with monitoring items for a utility company or the like. A meters read 54 piece of data may indicate how many and which meters in a certain area have been read. Billing data 56 may indicate past bills for particular customers and whether they have been paid. Rate information 58 may include various rates and indicate when each rate should be charged and to which customers. Usage data 60 may store past usage information to show peaks and valleys of usage by individual consumers as well as by groups of consumers. Performance information 62 may be information about the various embedded devices 24 and their related components and how they perform in the field, how long they typically last, what types of problems are occurring in the field, etc. Status and/or maintenance data 64 may also be stored. This data 64 may include the current status of the particular embedded devices 24 and/or larger groups of embedded devices 24. It may also include a maintenance history as well as future scheduled maintenance activities. Of course, those skilled in the art will appreciate that other data or information may also be collected by a data collector 32. FIG. 4 is only illustrative of types of information that may be collected and stored by a data collector 32 and is not meant to limit the broad scope and usefulness of the present embodiments.

Figure 5:
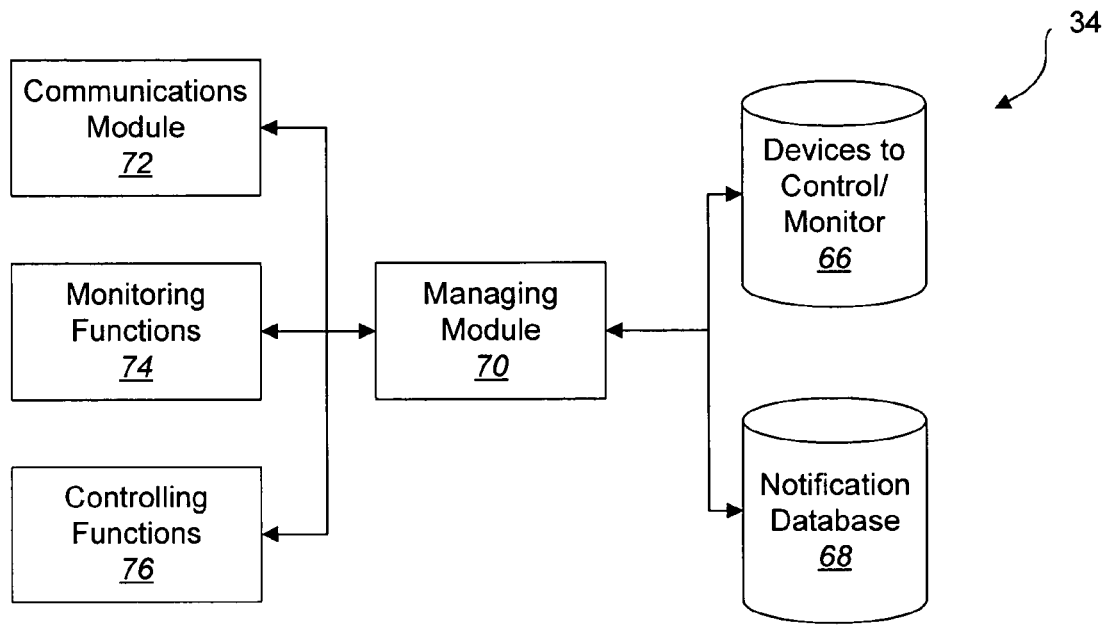
FIG. 5 is a block diagram of the modules and data or information that may be used by a controlling/monitoring service.

FIG. 5 is a block diagram of the modules and data or information that may used by a controlling/monitoring service 34. A database 66 may be used that includes the embedded devices 24 that need to be controlled and/or monitored. The information in this database 66 may include device identifications, routing information, location, device capabilities, etc. In addition, this database 66 may also include what controlling should be accomplished for each device and the particular control commands that should be sent. Those skilled in the art will appreciate that any data regarding or relating to the embedded devices 24 may be stored in this database 66. Of course, this database 66 may actually be a number of databases or a number of files.

A notification database 68 may include owner information and technical contacts. For example, for each device 24 being monitored and/or controlled, there may be an owner listed, who is likely paying for the service, as well as a technical contact person to contact when particular events occur. For example, if an embedded device 24 stops functioning, a controlling/monitoring service 34 may be instructed to immediately contact the technical contact person via pager, e-mail, telephone, etc.

A managing module 70 may manage the operation of the controlling and/or monitoring by reading in, or causing to be read in, data that indicates what actions should take place and by writing out, or causing to be written out, any output data. A communications module 72 may handle communications functions. Separate monitoring functions 74 may be accessed and used to monitor the embedded devices 24. For example, a library of monitoring functions 74 may be compiled to access and execute in monitoring various embedded devices 24. Typically, when engineers have developed software to monitor a particular type of embedded device 24, these functions to monitor may be reused in monitoring the same or similar types of embedded devices 24. Similarly, controlling functions 76 may be available and may be reused with similar types of devices 24.

Figure 6:
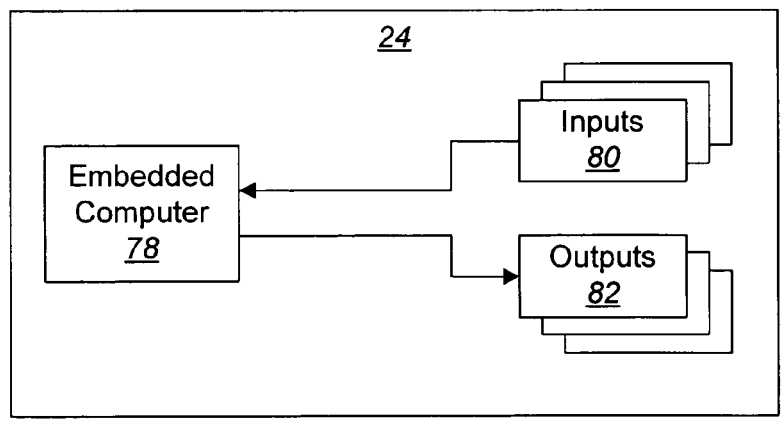
FIG. 6 is block diagram illustrating the major hardware components typically utilized in embedded devices.

FIG. 6 is block diagram illustrating the major hardware components typically utilized in embedded devices 24 or systems and embodiments herein. An embedded device 24 typically includes a processor 78 or embedded computer 78 in electronic communication with input devices 80 and/or output devices 82. The embedded computer 78 is operably connected to input 80 and/or output devices 82 capable of electronic communication with the embedded computer 78, or, in other words, to devices capable of input and/or output in the form of an electrical signal. Sometimes the input and output device(s) 80, 82 and the embedded computer 78 or processor 78 are both housed within the same physical structure. The input and/or output data sent and/or received may be referred to herein as interface data.

Figure 7:
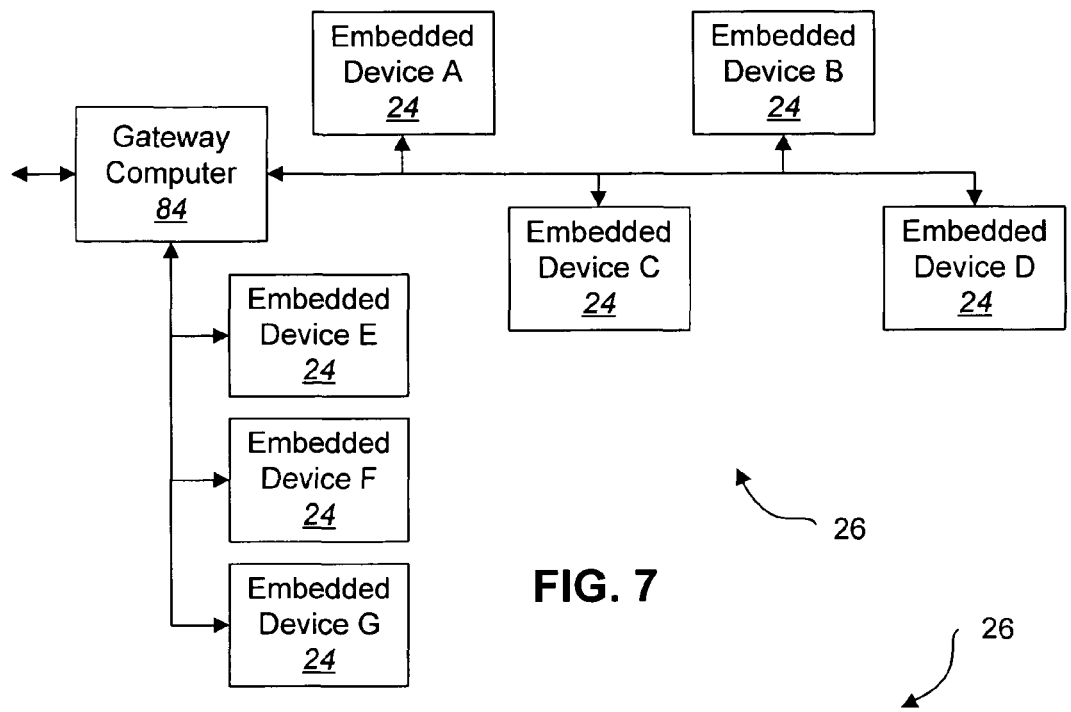
FIG. 7 is block diagram illustrating the major hardware components typically utilized in an embedded device network.

FIG. 7 is block diagram illustrating the major hardware components typically utilized in an embedded device network 26 and embodiments herein. An embedded device network 26 typically includes a host computer 84 or gateway computer 84 networked together with one or more embedded devices 24. The host computer 84 acts as a gateway between the embedded devices 24 and other computers (e.g., other computers on the computer network 22). In the present embodiments, the systems and methods herein are used to access a networked computer system where a host computer 84 is connected to one or more embedded devices 24. Typically the embedded device 24 includes an embedded computer 78 connected to input and output devices 80, 82. Particularly, in the present embodiments, the embedded computer 78 typically is a microcontroller (not shown). However, it will be appreciated by one skilled in the art that the functions and processing normally carried out by a microcontroller could be carried out by larger processors, whether they are part of a larger controller or part of a typical computer system.

The embedded computer 78 is typically remote from the host computer 84 in that the embedded computer 78 and host computer 84 are each computers capable of functioning on their own. The term remote does not necessarily mean that the embedded computer 78 is at a different location than the host computer 84, although in many embodiments the host computer 84 is at a different location than the embedded computer 78. Those elements discussed as being stored and/or implemented by the remote computer 78 could be stored and/or implemented at the host computer 84, in some circumstances.

The present systems and methods have broad application to many kinds of computer networks. Generally, embodiments of an embedded devices service provider 20 provide monitoring and/or controlling of embedded devices 24. The embedded computer 78 is operably connected to input and/or output devices 80, 82 capable of electronic communication with the remote computer 78, or, in other words, to devices capable of input and/or output in the form of an electrical signal. The service provider 20 establishes communication with the embedded device 24 to send and/or receive input and/or output data and to thereby interact with embedded devices 24.

The gateway 84 or host computer 84 is a broadly defined digital computer. The embedded device 24 or system 24 includes a digital computer but does not have typical input and/or output devices such as a keyboard, mouse, and/or monitor. A computer, as used herein, is any device that includes a digital processor capable of receiving and processing data. A computer includes the broad range of digital computers including microcontrollers, hand-held computers, personal computers, servers, mainframes, supercomputers, and any variation or related device thereof.

The input and output devices 80, 82 include any component, element, mechanism, appliance, or the like capable of receiving and/or generating an electronic signal. Examples of devices within the scope of the term device includes a vending machine, a telephone, a door lock, a temperature sensor, a motor, a switch, a light, etc.

In current design, the gateway computer 84 is typically an IBM-compatible personal computer running Linux, Microsoft Windows 95/98/2000 or the Microsoft Windows NT operating system.

One possible item that may be used with the embodiments herein is a vending machine (not shown). Many vending machines include one or more microcontrollers for controlling different parts of the vending machines. These microcontrollers fall within the scope of embedded computer. The input and output devices include the buttons for selecting items from the vending machine, switches for allowing those items to be dropped down to the user, lights for indicating which items are gone, the change release for releasing any change, etc. As known in the art, this vending machine embodiment includes the input and output devices 80, 82 and the remote computer(s) integrated within the same structure. Those skilled in the art will also realize that the embedded computer 78 may be in a separate structure from its attached input and output device(s) 80, 82. Many of the modern devices do come with embedded microcontrollers, for example, many cellular phones, pagers, and the like come with embedded microcontrollers.

The host or gateway computer 84 may be connected to the embedded devices 24 through a variety of connections, including RS 232, RS 485, modem, powerline, wired connection, wireless connection, etc. Similarly, the embedded computer 78 may be connected to various input and output devices 80, 82 through a variety of ways. As stated, typically the remote computer 78 comprises a microcontroller (not shown). Microcontrollers often have input/output ports for communicating with external devices. The specifications of the particular microcontroller often dictate how a device is connected to the microcontroller. Those skilled in the art appreciate how different devices may be connected to computers, whether they are embedded computers, standard desktop computers, mainframes, etc.

Figure 8:
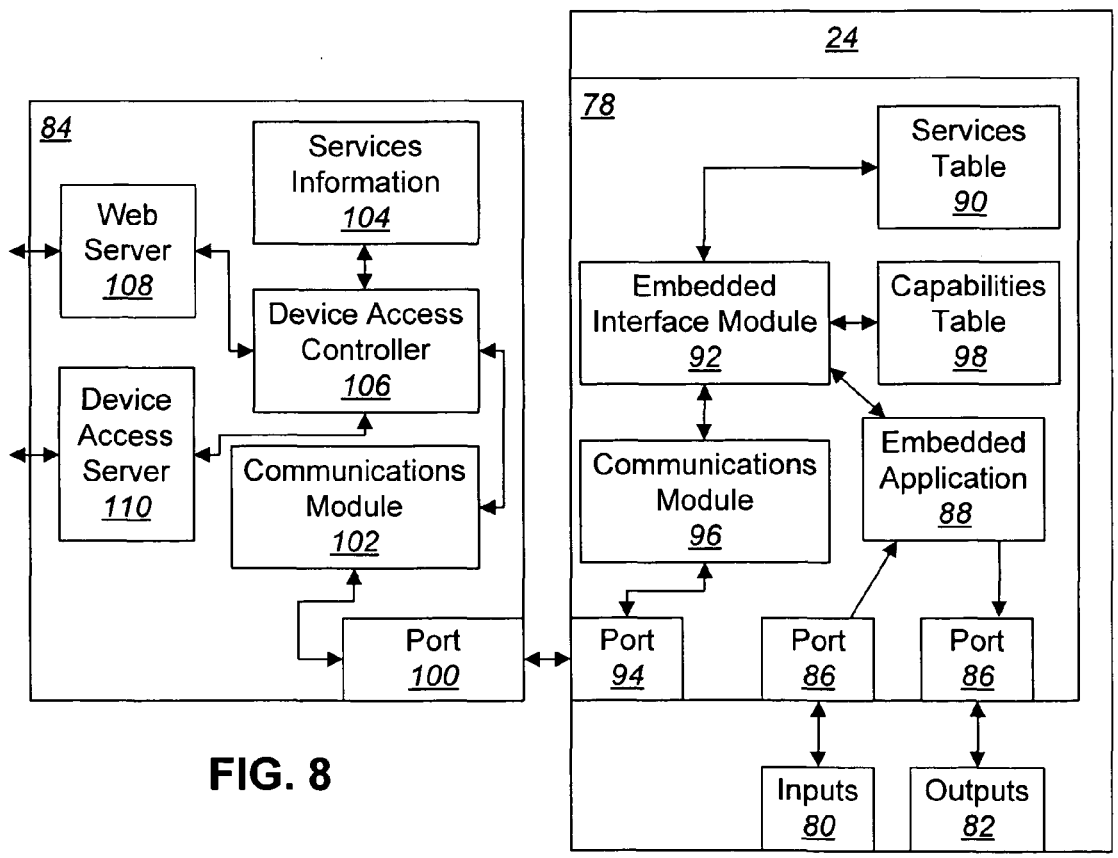
FIG. 8 depicts a block diagram of the major hardware and software components of an embodiment of an embedded device network.

FIG. 8 depicts a block diagram of the major hardware and software components of an embodiment of an embedded device network 26. As shown, the hardware elements of FIG. 8 correlate with those of FIG. 7. Those skilled in the art will appreciate that there are a variety of ways to interconnect the various hardware components, and that there are various configurations wherein one or more of the hardware elements may be eliminated by moving functionality from one hardware element to another.

The present embodiments enable a user to monitor and/or control services provided by the embedded device 24 through the service provider 20. The services of the embedded device 24 may be exposed by the embodiments such that they may be accessed over the computer network 22 and in an efficient manner.

In the present embodiments, data from input and/or output devices 80, 82 is read in and/or written out through input/output ports 86. An embedded application program 88 includes the executable instructions that directly interface with these input and/or output ports 86. Usually embedded applications 88 have a main loop which is iterated through over and over. Of course, embedded application developers may write an application that does not have a main loop that is continually iterated through. The principles herein could be applied to those applications not having a main loop and provide substantially the same benefits as are realized in the present embodiments.

Users, through software running on the embedded device service provider 20, may wish to access certain services provided by the embedded device 24. Services include different functions, variables, events, and/or files. For example, users may wish to execute particular functions, access certain variables, check on specified events, or access specific files. In current design, the services that a user may need access to are identified and listed. The identification of services also includes information about the certain services. This identification of certain services may be accomplished in a variety of ways. For example, in current design, a table 90 of services may be stored at the embedded computer 78. The services table 90 may be stored as a file, or it may be stored as static data that is compiled with the application 88, or it may be stored on a storage device (not shown) external to the remote computer 78. Those skilled in the art will realize that there are a variety of ways to store basic information about certain services provided by the application code running on the embedded computer 78. Table 2 contains pseudocode illustrating what types of information may be stored in the services table 90.

TABLE 2

| | |
|---|---|
| 2A | "FunctionA", function, word, void, &FunctionA |
| 2B | "FunctionB", function, int, float, &FunctionB |
| 2C | "VarA", variable, int, void, &varA |
| 2D | "VarB", variable, string, void, &varB |
| 2E | "EventA", event, byte, void, &eventA |
| 2F | "EventB", event, int, void, null |
| 2G | "FileA", file, void, void, &fileA |
| 2H | "FileB", file, void, void, &fileB |

As illustrated in Table 2, the services table 90 may include information such as the name or identification of the service, the type of service (e.g., whether it is a function, variable, event, file, etc.), the input parameter type, if any, the return type, if any, and the address of the service. Information about function FunctionA, shown at line (2A), is illustrated indicating that it is a function, it takes a word as an input parameter, it returns nothing (void), and its address is indicated at &FunctionA. Line (2B) illustrates the information about another function, FunctionB. Relevant information about variables are illustrated at lines (2C)-(2D). Information about events is illustrated at lines (2E)-(2F). Events may be any type of data. For example, an event could be a variable, a particular register, an interrupt, etc. Events may be particularly useful for items that occur asynchronously. Examples of asynchronous types of events include an alarm going off or an external LED changing. Information about certain files are illustrated at lines (2G) and (2H).

By storing information about certain services at the remote computer 78 or at the embedded device 24, software at the embedded device service provider 20 can readily ascertain what services are available at the embedded device 24. Usually the application code 88 defines the services. The services table 90 functions to provide information about certain services, where the information would be useful to a user at the host computer 84, to the service provider 20 or to a requestor across the computer network 22. A capabilities table 98 may also be provided at the embedded computer 78.

In current design, an embedded interface module 92 provides access between the services at the embedded computer 78 and software running at the host computer 84 and/or to software running at the embedded devices service provider 20. In embodiments herein, the interface module 92 uses information in the services table 90 to access the desired service on the remote computer 78. Further, in the presently preferred embodiment, the interface module 92 is reentrant code.

The interface module 92 communicates through a communications port 94. In current design, a communications module 96 provides communication using the communications port 94. One skilled in the art will appreciate, however, that the interface module 92 may include the code necessary to directly interface with the communications port 94 at the remote computer 78. The communications module 96 or code provides access to the communications port 94, and ensures that data is given to the communications port 94 in appropriately sized and formatted pieces, and that data received from the communications port 94 is correctly read from the port 94.

The host computer 84 includes a communication port 100 in electronic communication with the communications port 94 of the embedded device 24. As discussed earlier, there are a variety of such ports available with computers that are capable of interfacing with a remote and/or embedded computer port. A communication module 102 provides features similar to those provided by the communications module 96 of the embedded computer 78. The communications module 102 correctly formats data that is written to and read from the communications port 100.

The host computer 84 provides access to the services provided at the embedded computer 78 and at the embedded device 24. In the present embodiments, a portion of the capabilities table 98, the interfaces supported information, is retrieved from the embedded device 24 and from it a list of the services is created at the host computer 84 and/or at the service provider 20 that substantially corresponds to the services table 90. The list of services at the host computer 84 is referred to in FIG. 8 as services information 104. The services information 104 indicates what services are available at the embedded device 24 and what data types, if any, are used with individual services. This facilitates access via the host computer 84 to the embedded device 24.

In current design, a process is initially started on the host computer 84 and/or by the service provider 20 that causes the services information 104 to be created. The device access controller 106 provides this initial direction, in current design.

As stated, the embodiments may provide access to the services of the embedded device 24 to computers that are in electronic communication with the computer network 22 and to the service provider 20. To facilitate access by computers, the host computer 84 and/or the service provider 20 may include servers. A web server 108 may be started at the host computer 84 and/or at the service provider 20. The web server 108 may provide a web interface to services at the embedded device 24. For example, the data and/or services of the embedded device 24 may be represented graphically through HTML pages. Thus, the device access controller 106 may create web pages (not shown) from the services available at the embedded device 24, and the web server 108 may service HTTP requests for these web pages.

A device access server 110 may also be included at the host computer 84 and/or at the service provider 20 to service client requests for services of embedded devices 24. In current design, the device access server 110 accesses the services information 104 and makes this information available to clients at client computers across the computer network 22 (for example, to data collectors 32 and/or to controlling/monitoring services 34).

Figure 9:
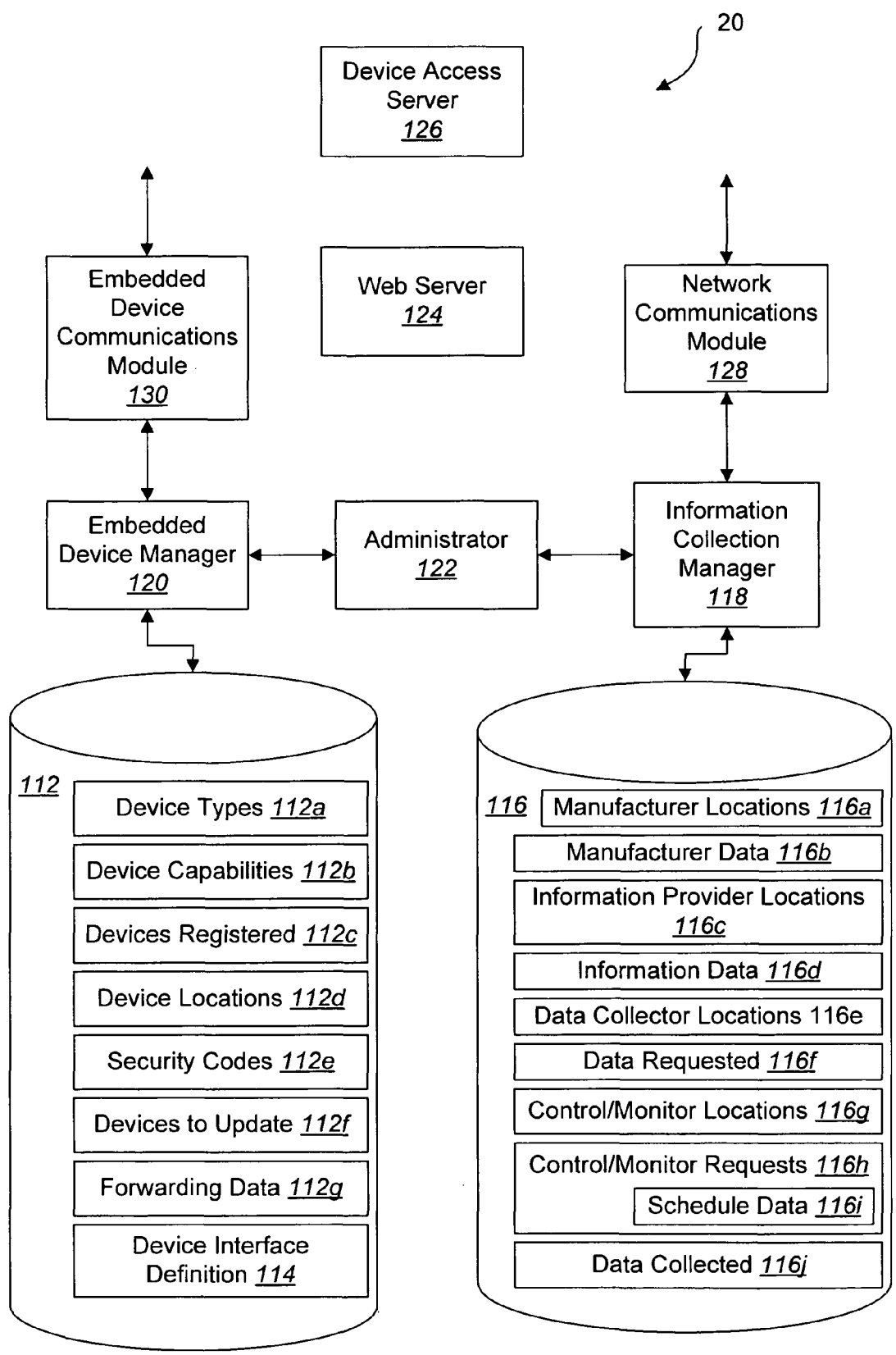
FIG. 9 illustrates the software and data components that may be utilized in an embodiment of a service provider for embedded devices.

FIG. 9 illustrates the software and data components that may be utilized in an embodiment of a service provider 20 for embedded devices. The service provider 20 includes a database 112 of embedded device information. This database 112 may be made available to, or made accessible by computers in electronic communication with the computer network 22. Database as used herein means any data structure or structures used to store data. A database may be one or more files, it may be a commercially available database package, etc. The embedded device information database 112 may contain information one skilled in the art would need to provide services to embedded devices 24. The embodiment of the embedded device information database 112 shown in FIG. 9 illustrates what types of data may be stored in the embedded device information database 112. Device interface definitions 114 that define how to communicate or interface with embedded devices 24 may be included. Table 3 contains pseudocode illustrating what types of information may be defined and included in an interface definition 114.

TABLE 3

| | |
|---|---|
| 3A | "FunctionA", function, word, void, &FunctionA |
| 3B | "FunctionB", function, int, float, &FunctionB |
| 3C | "VarA", variable, int, void, &varA |
| 3D | "VarB", variable, string, void, &varB |
| 3E | "EventA", event, byte, void, &eventA |
| 3F | "EventB", event, int, void, null |
| 3G | "FileA", file, void, void, &fileA |
| 3H | "FileB", file, void, void, &fileB |
| 3I | State information |
| 3J | Behavior information |
| 3K | Other |

As illustrated in Table 3, an interface definition may include information such as the name or identification of the service, the type of service (e.g., whether it is a function, variable, event, file, etc.), the input parameter type, if any, the return type, if any, and the address of the service. Information about function FunctionA, shown at line (3A), is illustrated indicating that it is a function, it takes a word as an input parameter, it returns nothing (void), and its address is indicated at & FunctionA. Line (3B) illustrates the information about another function, FunctionB. Relevant information about variables are illustrated at lines (3C)-(3D).

Information about events is illustrated at lines (3E)-(3F). Events may be any type of data. For example, an event could be a variable, a particular register, an interrupt, etc. Events may be particularly useful for items that occur asynchronously. Examples of asynchronous types of events include an alarm going off or an external LED changing.

Information about certain files are illustrated at lines (3G) and (3H). State information (3I) may also be included. The state information (3I) may include information defining what various states the embedded device 24 may be in, information defining any state machines of the embedded computer 78, etc. Behavior information (3J) may indicate how the embedded computer 78 will react and behave given a certain set of inputs, outputs and/or states. Of course, other (3K) defining information may be included as well, as those skilled in the art see fit.

A device types 112*a* data structure may contain information about what embedded devices 24 can be accessed and logical groupings of these devices 24. A device capabilities 112*b* data structure may include information on what capabilities each particular embedded device 24 has, similar to the capabilities table discussed above. Devices registered 112c information may contain information on what embedded devices 24 have been in contact with the service provider 20, which device's services have been paid for, etc. Device locations 112d may indicate where the embedded devices 24 are located, either in geographic terms or in electronic terms (such as, for example, a telephone number, an IP address, routing information, etc.).

The information in the embedded device information database 112 may be created without access to the embedded devices 24, or it may be created from information obtained from the embedded devices 24.

Embodiments herein may also implement security measures. For example, there may be embedded devices 24 and/or certain services of embedded devices 24 that should only be accessed by an entity holding the proper authority. A more specific example of this is a vending machine. A vending machine may only need to be accessed by particular entities, or it may have certain functions that should only be accessed by an authorized entity, such as, for example, the ability to change the prices on certain items, to drop certain items without payment or to lock certain items so that they may not be purchased. To provide proper authentication and access to embedded devices 24, the service provider 20 may include security codes 112e or information for validating proper client access. User names and passwords may be stored in the security codes 112e data to validate proper authorization.

Devices to update 112f information may be a listing of embedded devices 24 that need some type of updating. Forwarding data 112g may include information about where data from or relating to an embedded device 24 should be forwarded.

Another database 116 may be used by the service provider 20 to store information relating to entities, information, etc. on the computer network 22, and this database 116 and/or the information in this database 116 may be made available to embedded devices 24. This service information database 116 may include manufacturer locations 116a as well as manufacturer data 116b. In addition, it may store information provider locations 116c and some information data 116d provided by the information providers 30. Data collector locations 116e may be stored along with what data 116f has been requested by the data collector 32. Controlling/monitoring services locations 116g and their requests 116h may be stored. The controlling/monitoring requests data 116h may include schedule data 116i that indicates which devices should be controlled/monitored and how often they should be controlled/monitored. The schedule data 116i may include embedded device identifications and routing data.

In addition, other data collected 116j may be stored in the service information database 116. In embodiments herein, the locations stored are in the form of IP addresses, but it will be appreciated by those skilled in the art that other types of data may be stored that would indicate how to contact a particular entity.

An information collection manager module 118 may manage the data being stored into and read from the service information database 116. Similarly, an embedded device manager 120 may manage the data being stored into and read from the embedded device information database 112. An administrator module 122 may coordinate the operation of the service provider 20 and the communications between the managing modules 118, 120 and other modules included with the service provider 20.

As discussed in relation to FIG. 8, a web server 124 and a device access server 126 may be included in the service provider 20 to facilitate providing services to or for the embedded devices 24. A computer network communications module 128 may handle communications accomplished via the computer network 22. An embedded device communications module 130 may handle communications with the embedded devices 24. The embedded device communications module 130 may include both hardware and software components. For example, if embedded devices 24 are able to dial in directly to the service provider 20, the embedded device communications module 130 may include a modem bank (not shown) as well as communication software to handle the incoming calls and data communications. However, the embedded device communications module 130 may also use other communications hardware that is being shared by other resources. In this case, the embedded device communications module 130 would typically include software to handle the communications that it is to receive. Those skilled in the art will appreciate the many communication packages and alternatives, both hardware and software, that may be utilized in the embodiments of a service provider 20.

Figure 10:
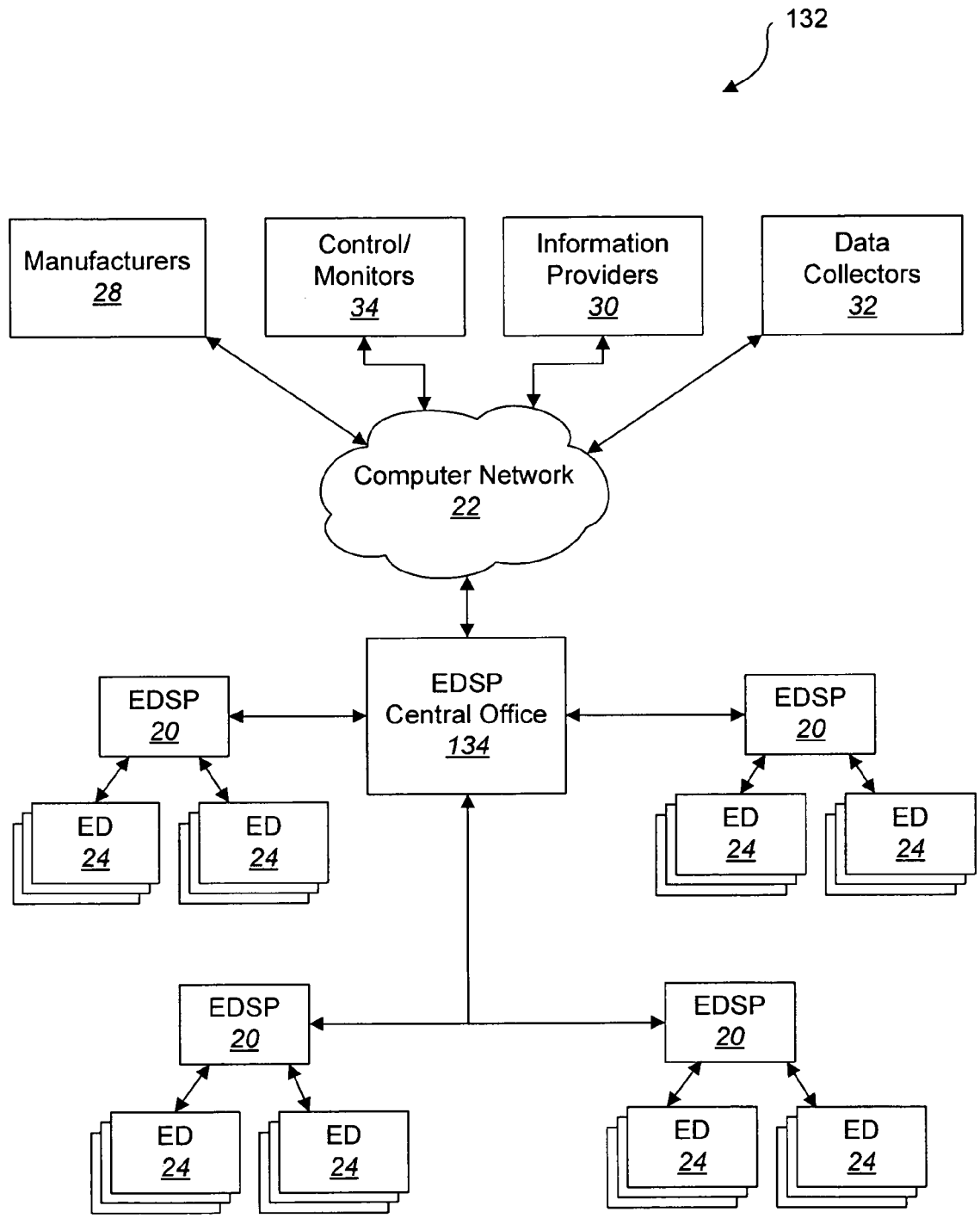
FIG. 10 is a block diagram illustrating a system for providing services to embedded devices.

FIG. 10 is a block diagram illustrating a system 132 for providing services to embedded devices 24. As shown, the system 132 may include a plurality of embedded devices service providers 20 that are coordinated by a central office 134. The central office 134 may also coordinate communications via the computer network 22 with manufacturers 28, information providers 30, data collectors 32 and controlling/monitoring services 34. The individual service providers 20 for embedded devices 24 may be located in various locations to adequately service embedded devices 24 being used in the field. Depending on the particular embedded devices 24, some service providers 20 may need to be more proximate to embedded devices 24. Other service providers 20 may not need to be at a proximate location but may only need an electronic connection, whether physically close to or far away from its embedded devices 24.

Figure 11:
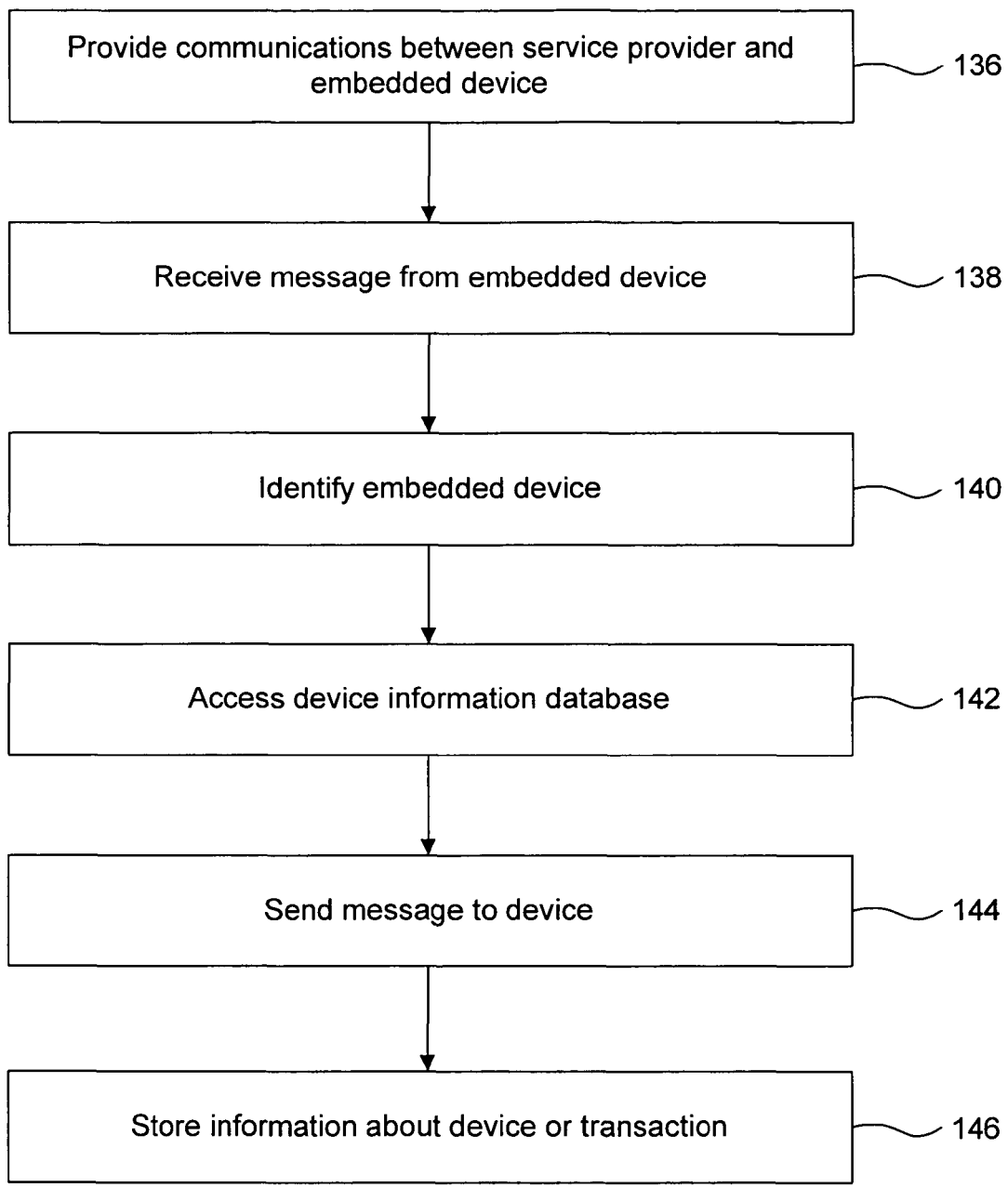
FIG. 11 is a flow diagram illustrating steps of a method of an embodiment for providing service to a plurality of embedded devices.

FIG. 11 is a flow diagram illustrating steps of a method of an embodiment for providing service to a plurality of embedded devices 24. Electronic communications is provided 136 between the service provider 20 for embedded devices and an embedded device 24. A message may then be received 138 from the embedded device 24. The embedded device 24 may then be identified 140 through use of the message received. This identification may either be of the particular embedded device 24 or of the type of embedded device 24. The service provider 20 may access 142 the embedded device information database. In embodiments herein, the service provider 20 is able to identify embedded devices 24 after accessing the embedded device information database 112. Accordingly, those skilled in the art will appreciate that a number of the steps herein may be performed in various orders to accomplish substantially similar results. The service provider 20 may send 144 a transmit message to the embedded device 24 and store 146 device information descriptive of a transaction. Information about the transaction (about the message(s) sent or received) may be used for billing purposes.

Other steps may also be performed in practicing present embodiments. For example, newly obtained information from the computer network (to be placed in the service information database 116) may be linked to certain information in the embedded device information database 112. In this way, the service provider 20 will be aware of updated information when dealing with a particular device 24 or type of device. The message received from the embedded device 24 may be parsed to obtain an embedded device identifier, which may be a number, a text string, etc. Methods practiced herein also may use the schedule data of the controlling/monitoring requests to monitor or control embedded devices.

Figure 12:
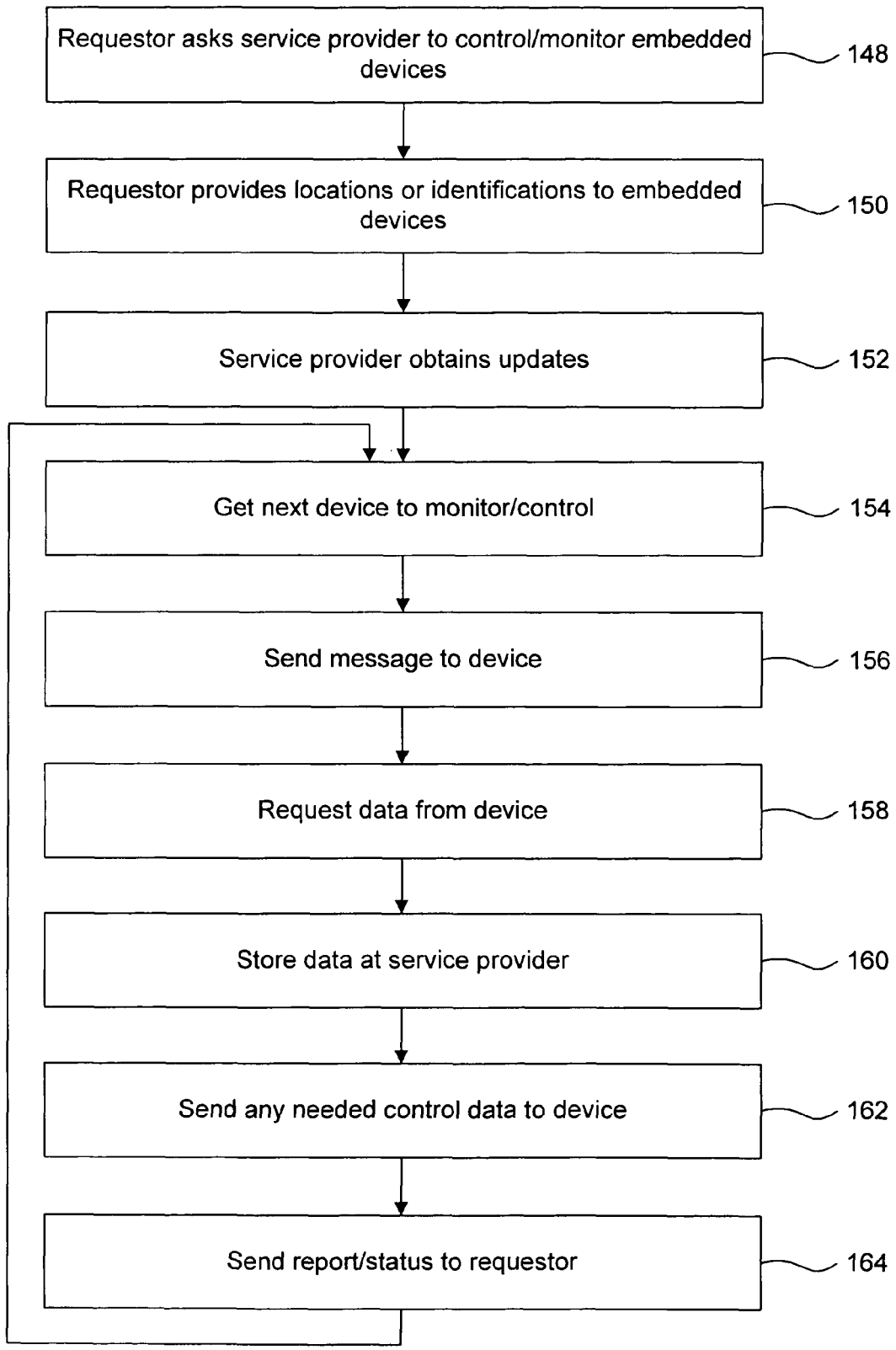
FIG. 12 is a flow diagram illustrating steps of a method of an embodiment for providing service to a plurality of embedded devices.

FIG. 12 is a flow diagram illustrating steps of a method of an embodiment for providing service to a plurality of embedded devices 24. Requestors (users, companies, or other entities) may ask 148 an embodiment of a service provider 20 to monitor and/or control one or more embedded devices 24. The requestor may provide 150 the locations (whether electronic addresses or physical locations) or identifications of the embedded devices 24 to the service provider 20. The service provider 20 may obtain 152 any data or software updates that may be needed by the embedded devices 24. This may be done by accessing manufacturer's 28 web sites.

The service provider 20 may then enter an iterative loop to control/monitor embedded devices 24. The provider 20 may get 154 the next device 24 to monitor or control. Depending on whether this is the first iteration through a particular list of devices to monitor/control, this step may either be getting the next device or getting the first device in a particular list. The service provider 20 may then send 156 a message to the device and establish communications. The provider 20 may then request 158 data, which may be interface data, from the device and store 160 the data obtained. If control has been requested, the service provider 20 may send 162 control data to the device 24. This control data may include directions or instructions for the device 24 to facilitate control. If a requestor has asked for a report or a status, the service provider 20 may send 164 a report or status to the requestor. The service provider 20 may then get the next device and cycle through the steps for each additional device.

Commercially available software from emWare, Inc. is used in implementing the present embodiments. emWare, Inc. may be contacted through its web site at www.emware.com. One skilled in the art will appreciate how the commercially available software items from emWare can be used with the present embodiments. The following is a general and basic description of technology of emWare that is used in the present embodiments.

emWare's business centers around microcontrollers that manage many electronic devices used in today's world, including telephones, home appliances, office equipment, ATMs, security systems, VCRs, automobiles, etc. These microcontrollers are embedded into millions of intelligent electronic devices.

emWare has developed technology and software which provide distributed network-based device control. emWare's Embedded Micro Internetworking Technology (EMIT) software is designed to move the majority of software off of the embedded microcontroller and distribute it to more capable computers over a network. EMIT has also been developed to leverage existing Internet technologies.

Use of EMIT software involves various components including the following: the customer's embedded application, emMicro software (which correlates to the embedded interface module), emGateway software, emNet software (which correlates to the communication modules), and the customer's monitoring/controlling application. Typically, potential customers of emWare already have embedded environments in which they plan to deploy emWare's EMIT software to enhance their monitoring and controlling capabilities. These embedded environments typically include the embedded system, the host computer, and client computers.

Figure 13:
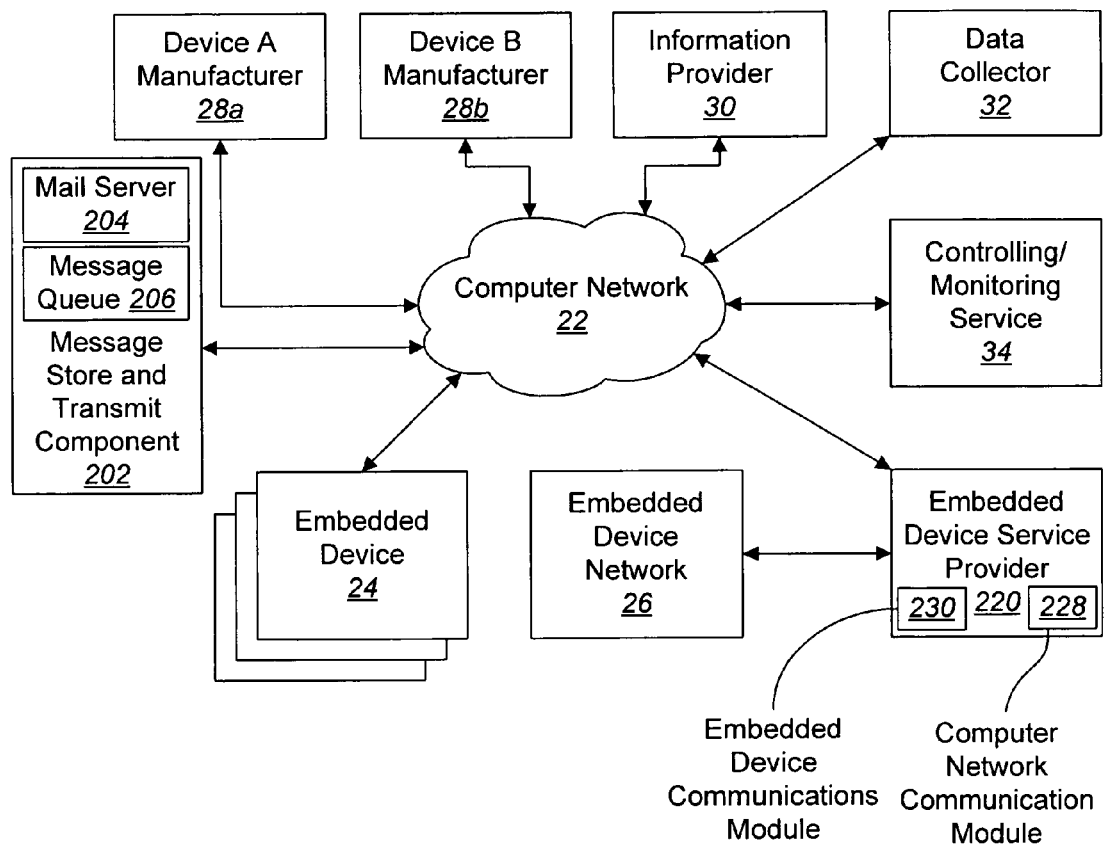
FIG. 13 is a block diagram illustrating the major components typically utilized in the use of a new embodiment service provider and the way in which it may be used.

Referring now to FIG. 13, a block diagram of the major components of a further embodiment is illustrated. As can be seen in FIG. 13, this Figure is similar to FIG. 1 which was described above. Accordingly, those of skill in the art will realize that much of the foregoing descriptions of FIG. 1 and the other Figures will equally apply to the embodiments shown in FIG. 13. For the purposes of brevity, however, much of this foregoing description will not be repeated.

The embodiment shown in FIG. 13 includes an embedded device service provider 220 that may be similar and/or identical to the previously described service provider 20. However, in the embodiment shown in FIG. 13, the service provider 220 differs from the previously described service provider 20 in that the service provider 220 is not in direct, electronic communication with the one or more embedded devices 24. Rather, as will be explained in greater detail below, the service provider 220 communicates with the embedded devices 24 through the computer network 22 and a message store and transmit component ("MSTC") 202.

The MSTC 202 is a device or component that communicates with the computer network 22. Accordingly, various types of hardware and software that are known in the art may be used or included as part of the MSTC 202. In some embodiments, the MSTC 202 may comprise a mail server 204 that communicates with the computer network 22 by sending and/or receiving email messages over the computer network 22. In other embodiments, the MSTC 202 may comprise a message queue 206 that sends/receives messages over the network 22. Of course, those of skill in the art will recognize that other types of devices may also be used.

The MSTC 202 also communicates with the service provider 220 via the communications network 22. In some embodiments, this communication occurs via a computer network communications module 228 that may be added to the service provider 220. In general, the computer network communications module 228 is a component specifically designed/programmed to handle communications accomplished via the computer network 22 and may be similar and/or identical to the computer network communications module 128 discussed above. In general, the computer network communications module 228 includes various software and/or hardware components that facilitate and/or allow communication to occur via the network 22.

An embedded device communications module 230 may also be added to the service provider 220 and may be used to handle communications with the MSTC 202. More particularly, the embedded device communications module 230 may be used to process/interpret the information in the communication received from the MSTC 202 and/or determine the appropriate/necessary response.

Figure 14:
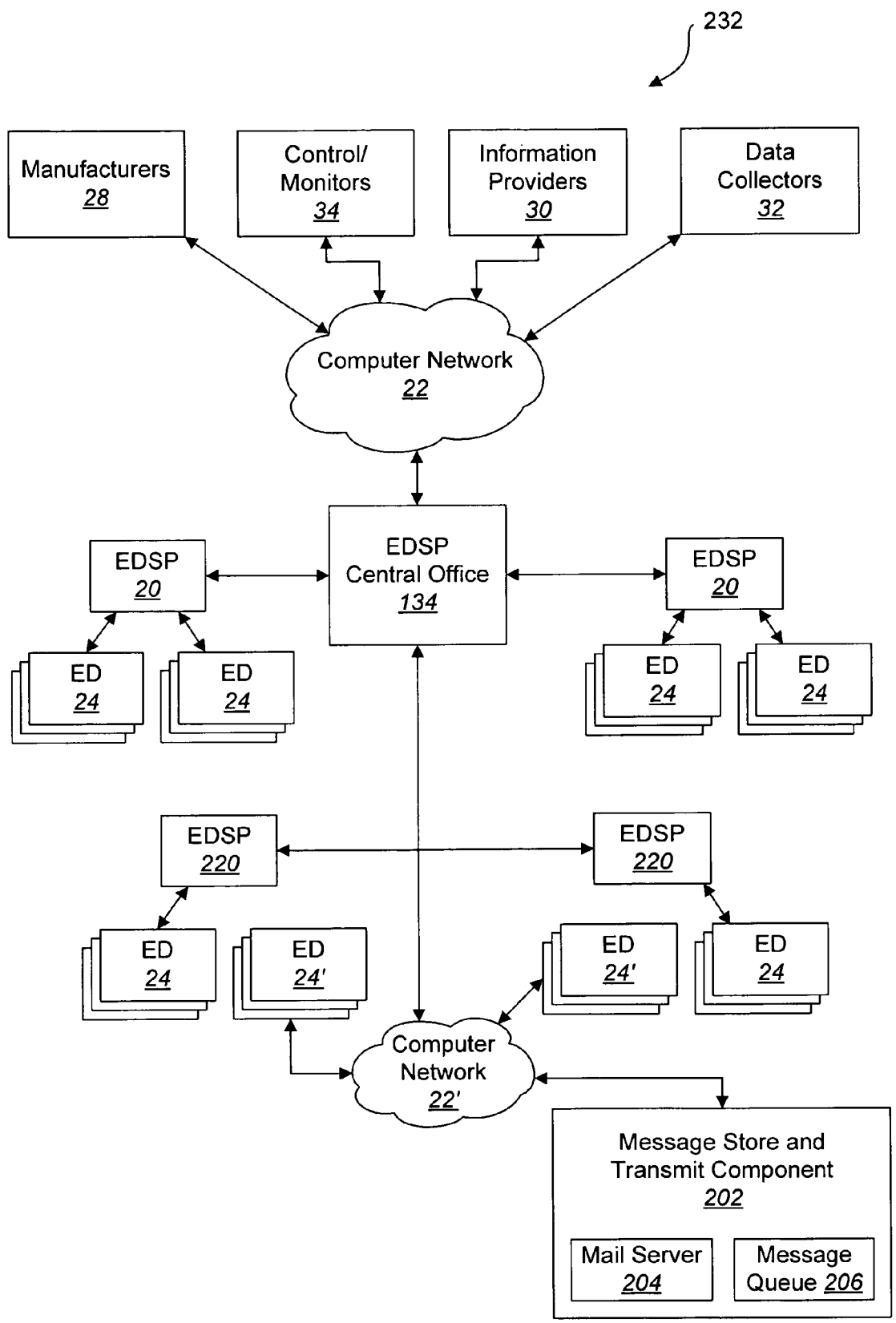
FIG. 14 is a block diagram illustrating another embodiment of a system for providing services to embedded devices.

Referring now to FIG. 14, a block diagram illustrates a system 232 for providing service to embedded devices 24. The system shown in FIG. 14 is similar to the system 132 that was outlined above in conjunction with FIG. 10. However, system 232 differs from that which was discussed above in that it includes one or more service providers 220 that are designed to indirectly communicate with embedded devices 24' via a computer network 22' and the MSTC 202. As shown in FIG. 14, the service providers 220 may also be configured such that it is capable of communicating directly with other embedded devices 24 in the manner described previously.

In FIG. 14, the computer network 22' is shown as a separate and distinct element from computer network 22. However, such a representation is only made for clarity of the drawing and should not be interpreted as being limiting. Other embodiments may also be made in which the computer network 22' is the same as the computer network 22.

The system 232 shown in FIG. 14 has been configured such that the central office 134 communicates with the MSTC 202 via the network 22'. Of course, other embodiments may also be made in which the central office 134 only communicates with the service providers 220, which in turn, transmits/forwards the information sent by the central office 134 to the MSTC 202 via the network 22'.

Figure 15:
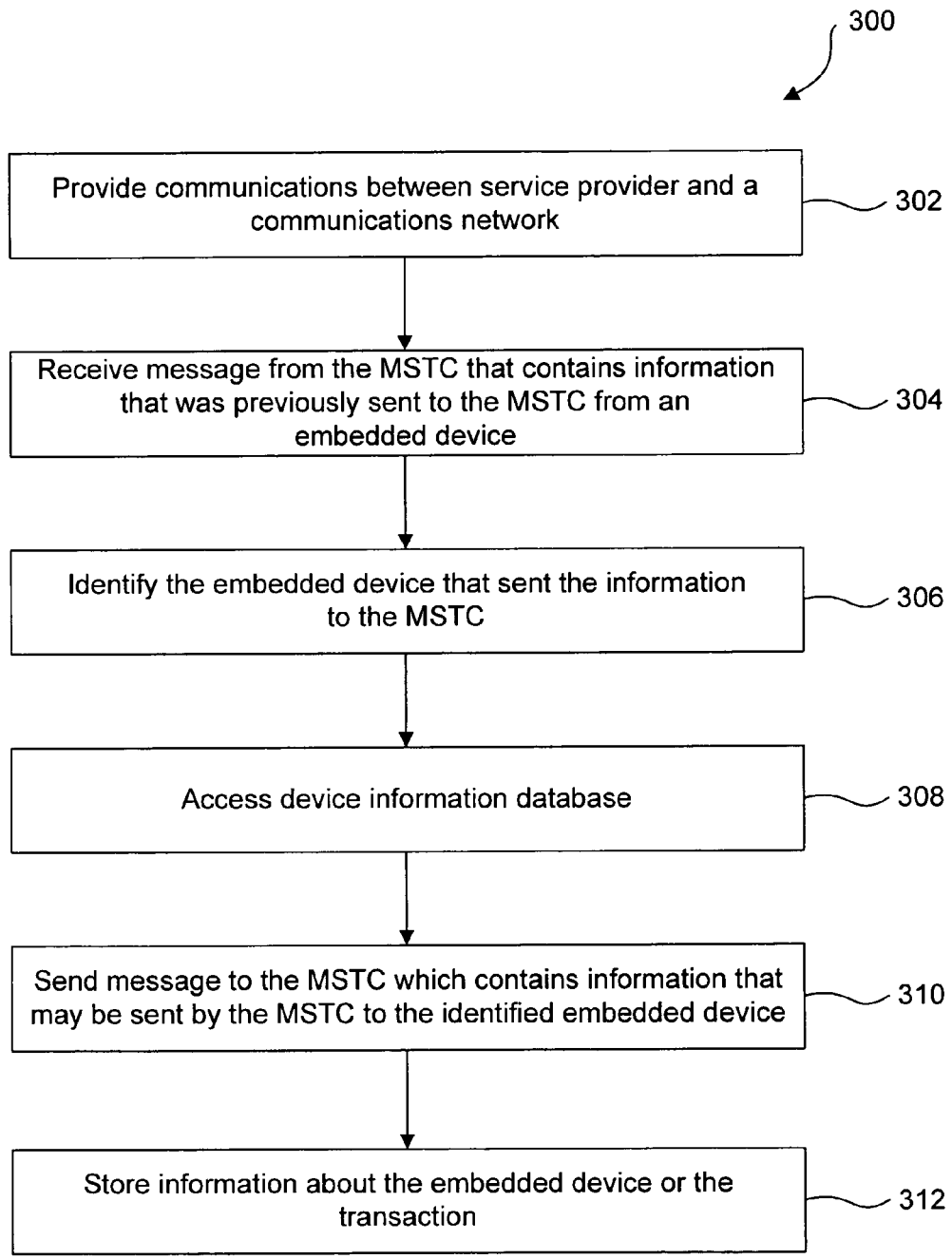
FIG. 15 is a flow diagram illustrating steps of a method of another embodiment for providing service to a plurality of embedded devices.

Referring now to FIG. 15, the way in which the service provider 220 may be used to provide service to the embedded devices 24 is illustrated. Particularly, FIG. 15 is a flow diagram illustrating steps of a method 300 of an embodiment for providing service to a plurality of embedded devices 24. First, electronic communication is provided 302 between the service provider 220 for embedded devices and the communications network 22. A message may then be received 304 by the service provider 220 that was sent from the MSTC 202. In general, this message sent by the MSTC 202 contains information that was previously sent to the MSTC 202 from the embedded device 24. In some embodiments, this step may be accomplished by having the embedded device 24 send an initial email to the MSTC 202 via the computer network 22. This initial email and/or information derived from this initial email, may then sent/forwarded onto the service provider 220 through the network 22. Of course, other ways of having the provider 220 receive information that was previously sent by the embedded device 24 to the MSTC 202 may also be used.

The next step in the method 300 involves identifying 306 the particular embedded device 24 that sent the information to the MSTC 202. This identification may either be of the particular embedded device 24 or of the type of embedded device 24. In some embodiments, the identification may be accomplished by having the message sent from the MSTC 202 include a device identifier, as described in greater detail above. In further embodiments, this identification may also involve having the message sent from the MSTC 202 include a device description. As described above, this type of device description may include information related to functions, variables, data types, events, files, and/or other information that has been gathered or stored by the embedded device 24.

Still further embodiments may be constructed in which the embedded device 24 sends interface data to the MSTC 202 that is then sent by the MSTC 202 to the service provider 220. As described above, this interface data may then be stored by the provider 220 on a storage device and/or converted into monitoring data that may be sent to a requester or other third party via the computer network 22.

Once the embedded device 24 has been identified, the next step in the method 300 involves having the provider 220 access 308 the embedded device information database. The service provider 220 may send 310 a transmit message to the MSTC 202 which contains information that may be sent by the MSTC 202 to the identified embedded device 24. Again, in some embodiments, this step may be accomplished by having the provider 220 send an email message containing the information to the MSTC 202 via the network 22. The MSTC 202 may then forward this email message onto the embedded device 24 and/or the MSTC 202 may extract all or part of the information from the email and then send a Pew communication to the embedded device 24.

Some embodiments may be also made in which the message that is sent to the MSTC 202 contains control data that is designed to be sent by the MSTC 202 to the embedded device 24. As described in greater detail above, this control data may be designed such that it interacts with the computer code loaded on the embedded device to affect the operation and/or properties of the embedded device. In further embodiments, the schedule data 116i loaded on the service provider 220 may govern when this periodic control data is sent to the MSTC 202. Other types of information may also be sent to the MSTC 202 so that it may be transmitted onto the embedded device 24 including updates in computer program code (that were obtained from the device manufacturer), updated service information, information obtained from the information provider 30 (such as weather information and the like), monitoring data, and/or other types of information/data.

Lastly, the final step of the method 300 may involve storing 312 device information descriptive of a transaction. Information about the transaction (about the message(s) sent or received) may be used for billing or other purposes.

Other steps may also be performed in practicing present embodiments. For example, newly obtained information from the computer network (to be placed in the service information database 116) may be linked to certain information in the embedded device information database 112. In this way, the service provider 220 will be aware of updated information when dealing with a particular device 24 or type of device. The message received from the embedded device 24 may be parsed to obtain an embedded device identifier, which may be a number, a text string, etc. Methods practiced herein also may use the schedule data of the controlling/monitoring requests to monitor or control embedded devices.

Figure 16:
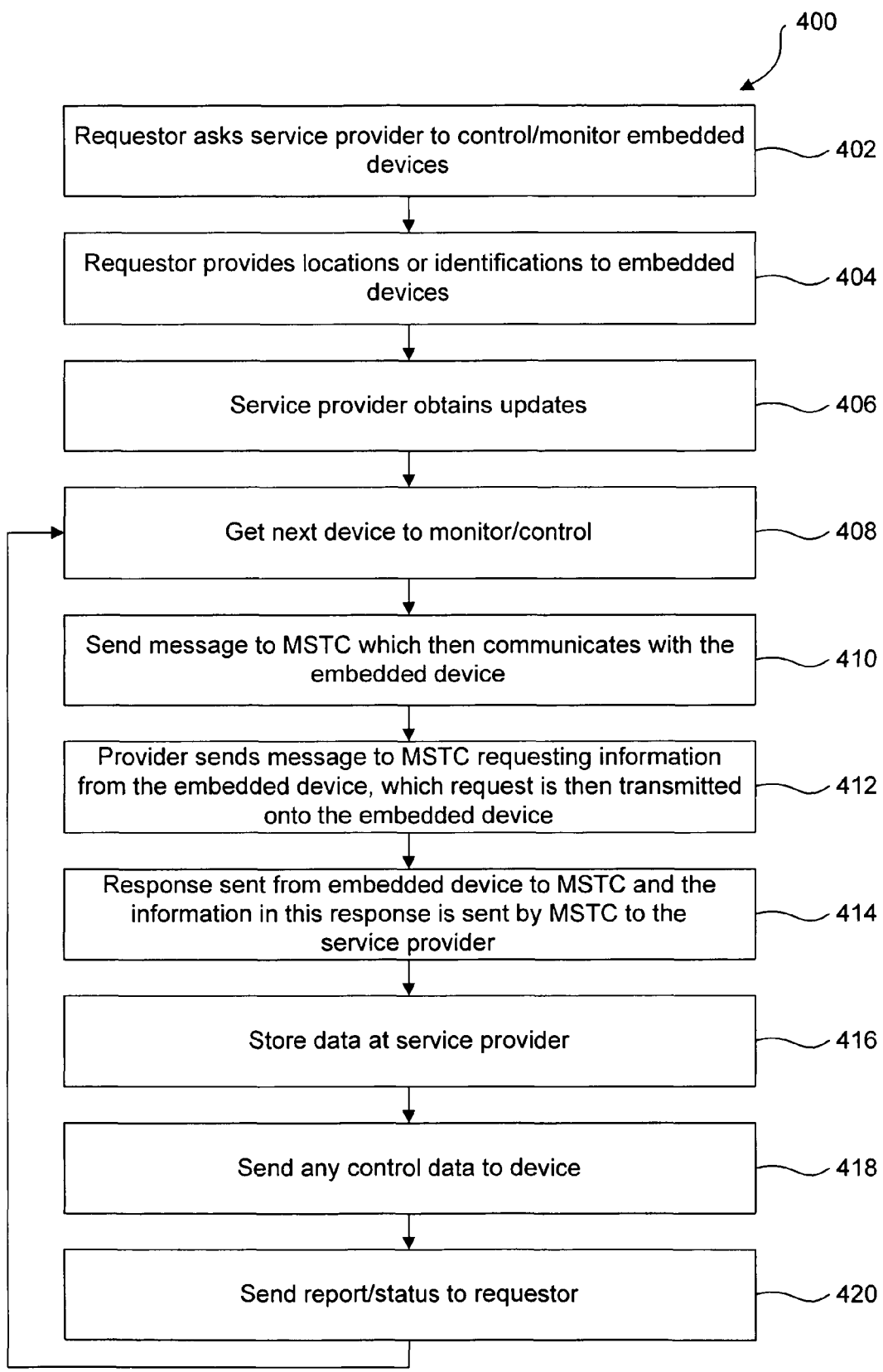
FIG. 16 is a flow diagram illustrating steps of a method of another embodiment for providing service to a plurality of embedded devices.

FIG. 16 is a flow diagram illustrating steps of a method 400 of an embodiment for providing service to a plurality of embedded devices 24. Requestors (users, companies, or other entities) may ask 402 an embodiment of a service provider 220 to monitor and/or control one or more embedded devices 24. The requestor may provide 404 the locations (whether electronic addresses or physical locations) or identifications of the embedded devices 24 to the service provider 220. One example of an identification of an embedded device 24 may be an email address. The service provider 220 may obtain 406 any data or software updates that may be needed by the embedded devices 24. This may be done, for example, by accessing manufacturer's 28 web sites.

The service provider 220 may then enter an iterative loop to control/monitor embedded devices 24. The provider 220 may get 408 the next device 24 to monitor or control. Depending on whether this is the first iteration through a particular list of devices to monitor/control, this step may either be getting the next device or getting the first device in a particular list.

The service provider 220 may then send 410 a message to the MSTC 202, which in turn, will communicate with the embedded device 24. The provider 220 may then send a message 412 to the MSTC 202 which requests data from the device 24. Again, this message and/or the information contained therein, will be sent by the MSTC 202 to the embedded device 24. In some embodiments, the information requested by the service provider 220 may be interface data and/or other data regarding the status/condition of the embedded device 24.

Once the embedded device 24 receives the information request from the MSTC 202, the embedded device 24 will then send a response 414 to the MSTC 202. Again, this response and/or the information contained in the response will be sent by the MSTC 202 to the service provider. If necessary or desired, the service provider 220 may then store 416 the data/information that was sent by the embedded device 24.

If control of the embedded device 24 has been requested, the service provider 220 may send 418 control data to the device 24. This control data may include directions or instructions for the device 24 to facilitate control. If a requestor has asked for a report or a status, the service provider 220 may send 420 a report or status to the requestor. The service provider 220 may then get the next device and cycle through the steps for each additional device.

Although the above-recited methods have given a specific order in which the steps may be performed, those of skill in the art will appreciate that a number of the steps herein may be performed in various orders to accomplish substantially similar results.

From the above discussion, it will be appreciated that the present embodiments provide a service provider for embedded devices and/or embedded systems.

The embodiments herein may be embodied in other specific forms without departing from their spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

While specific embodiments and applications of the present invention have been illustrated and described, it is to be understood that the invention is not limited to the precise configuration and components disclosed herein. Various modifications, changes, and variations which will be apparent to those skilled in the art may be made in the arrangement, operation, and details of the methods and systems of the present invention disclosed herein without departing from the spirit and scope of the invention.

What is claimed is:

1. An embedded device service provider, the embedded device service provider comprising:
    communications hardware for communicating over a computer network, the communications hardware being configured to communicate via the computer network with a message store and transmit component, wherein the message store and transmit component communicates with one or more embedded devices through the computer network, and wherein an embedded device is not a desktop computer;
    memory;
    an embedded device information database including embedded device information, the embedded device information database being available to the computer network;
    a service information database including service information obtained from the computer network, the service information database being available to the embedded devices through the message store and transmit component, wherein the service information is sent in a message from the database of service information to the message store and transmit component and then from the message store and transmit component to the embedded device; and
    a processor;
    instructions stored in the memory, the instructions being executable by the processor to:
    receive a message from the message store and transmit component, the message store and transmit component having previously received information from the embedded device;
    identify the embedded device that sent the information to the message store and transmit component;
    access the embedded device information database;
    send information to the message store and transmit component that may be then sent by the message store and transmit component to the embedded device, wherein the information sent comprises updated computer program code, wherein the updated computer program code is obtained from a plurality of information providers, wherein the service provider communicates with the plurality of information providers via the computer network, and wherein the service provider sends the updated computer program code to the embedded device causing computer program code on the embedded device to be updated, wherein the embedded device does not communicate directly with the information providers; and
    store device information descriptive of a transaction.

2. The service provider of claim 1 wherein the embedded device information database further comprises:
    linking data that links certain embedded device information to certain updated service information;
    a plurality of embedded device identifiers; and
    a plurality of capabilities tables.

3. The service provider of claim 2 further comprising schedule data, the schedule data including embedded device identifications and routing data, the schedule data being used to control monitoring of a plurality of embedded devices.

4. The service provider of claim 3 wherein the embedded device information database further comprises interface data that was received from the message store and transmit component, the interface data having been previously sent from the embedded device to the message store and transmit component.

5. The service provider of claim 4 further comprising control data to be sent to the message store and transmit component and may then be sent on to the embedded device, the control data being capable of affecting the operation of the embedded device.

6. The service provider of claim 1 wherein the service information database further includes updated service information that has been obtained via the computer network.

7. A service provider for embedded devices comprising:
    a computer, the computer including communications hardware for communicating over a computer network, the computer also including a storage device;
    a computer network communications module for communicating with computers via the computer network, the computer network communication module being configured to communicate via the computer network with a message store and transmit component, wherein the message store and transmit component communicates with one or more embedded devices through the computer network, and wherein an embedded device is not a desktop computer;
    a database of service information obtained from the computer network, the database being available to the embedded devices through the message store and transmit component, wherein the service information is sent in a message from the database of service information to the message store and transmit component and then from the message store and transmit component to the embedded device;
    an information collection manager for searching the computer network and for accessing and obtaining updated service information from a plurality of information providers via the computer network, wherein the updated service information obtained from the computer network comprises updated computer program code, and wherein the service provider communicates with the plurality of information providers via the computer network and sends the updated computer program code to the embedded device causing computer program code on the embedded device to be updated, wherein the embedded device does not communicate directly with the information providers; and
    a database interface module for accessing the service information in the service information database.

8. The service provider of claim 7 further comprising an embedded device communications module that handles the communications with the message store and transmit component.

9. The service provider of claim 8 wherein the embedded device communications module handles at least one communication from the message store and transmit component that includes an embedded device identifier.

10. The service provider of claim 7 further comprising schedule data, the schedule data including embedded device identifications and wherein the schedule data is being used to control monitoring of the embedded devices.

11. The service provider of claim 10 wherein the service provider controls an embedded device by periodically sending control data to computer program code loaded on the embedded device to affect operation of the embedded device, wherein the periodic sending is based on the schedule data, and wherein the control data is sent from the service provider to the message store and transmit component and is then sent by the message store and transmit component to the embedded device.

12. The service provider of claim 7 wherein the service provider obtains from the message store and transmit component a device description, the device description having previously been sent from the embedded device to the message store and transmit component.

13. The service provider of claim 12 wherein the device description is selected from the group consisting of functions, variables, data types, events and files.

14. The service provider of claim 7 wherein the service provider monitors an embedded device by periodically obtaining from the message store and transmit component interface data that was previously sent from the embedded device to the message store and transmit component, and wherein the service provider stores the interface data on the storage device.

15. The provider of claim 14 wherein the service provider stores monitoring data created from the interface data received and wherein the service provider further provides the monitoring data to a requestor through the computer network.

16. The service provider of claim 7 wherein the message store and transmit component comprises a mail server.

17. The service provider of claim 7 wherein the message store and transmit component comprises a message queue.

18. The service provider of claim 7 wherein the updated service information obtained from the computer network further comprises a location of an embedded device.

19. A service provider for embedded devices comprising:
a computer, the computer including communications hardware for communicating over a computer network, the computer also including a storage device;
a computer network communications module for communicating with computers via the computer network, the computer network communication module being configured to communicate via the computer network with a message store and transmit component, wherein the message store and transmit component communicates with one or more embedded devices through the computer network, and wherein an embedded device is not a desktop computer;
a database of embedded device information, the embedded device information being available to the computer network, wherein the embedded device information is sent in a message from the database of embedded device information to the message store and transmit component and then from the message store and transmit component to the embedded device;
an information collection manager for searching the computer network and for accessing and obtaining updated embedded device information from a plurality of information providers via the computer network, wherein the updated embedded device information obtained from the computer network comprises updated computer program code, and wherein the service provider communicates with the plurality of information providers via the computer network and sends the updated computer program code to the embedded device causing computer program code on the embedded device to be updated, wherein the embedded device does not communicate directly with the information providers; and
a database interface module for accessing the service information in the service information database.

20. The service provider of claim 19 further comprising schedule data, the schedule data including embedded device identifications and wherein the schedule data is being used to control monitoring of the embedded devices.

21. The service provider of claim 20 wherein the service provider controls an embedded device by periodically sending control data to computer program code loaded on the embedded device to affect operation of the embedded device, wherein the periodic sending is based on the schedule data, and wherein the control data is sent from the service provider to the message store and transmit component and is then sent by the message store and transmit component to the embedded device.

22. The service provider of claim 19 wherein the service provider obtains from the message store and transmit component a device description, the device description having previously been sent from the embedded device to the message store and transmit component.

23. The service provider of claim 22 wherein the device description is selected from the group consisting of functions, variables, data types, events and files.

24. The service provider of claim 19 wherein the service provider monitors an embedded device by periodically obtaining from the message store and transmit component interface data that was previously sent from the embedded device to the message store and transmit component, and wherein the service provider stores the interface data on the storage device.

25. The service provider of claim 24 wherein the service provider stores monitoring data created from the interface data received and wherein the service provider further provides the monitoring data to a requestor through the computer network.

26. The service provider of claim 19 further comprising an embedded device communications module that handles the communications with the message store and transmit component.

27. The service provider of claim 19 wherein the embedded device information database includes a plurality of capabilities tables.

28. A method for providing service to a plurality of embedded devices, the method comprising:
providing electronic communications between a service provider for embedded devices and a communications network;
receiving a communication via the communications network from the message store and transmit component which contains information that was previously sent to the message store and transmit component by an embedded device, and wherein an embedded device is not a desktop computer;

identifying the embedded device that sent the information to the message store and transmit component;

accessing an embedded device information database;

sending a message via the communications network from the service provider to the message store and transmit component which contains information that is later sent by the message store and transmit component to the embedded device, wherein the message comprises updated computer program code, and wherein the database updated computer program code is obtained from a plurality of information providers, wherein the service provider communicates with the plurality of information providers via the computer network, and wherein the service provider sends the updated computer program code to the embedded device causing computer program code on the embedded device to be updated, wherein the embedded device does not communicate directly with the information providers; and storing device information descriptive of a transaction.

29. The method of claim 28 further comprising:

periodically obtaining interface data sent from computer program code loaded on the embedded device to the message store and transmit component and then later sent by the message store and transmit component to the provider; and storing the interface data on a storage device.

30. The method of claim 29 further comprising providing the interface data to a requestor through the computer network.

31. The method of claim 28 further comprising collecting updated information from the computer network relating to embedded devices.

32. The method of claim 28 further comprising linking certain information in the embedded device information database to certain updated information.

33. The method of claim 28 further comprising parsing the message received from the message store and transmit component to obtain an embedded device identifier.

34. The method of claim 28 further comprising monitoring the plurality of embedded devices based on schedule data, the schedule data including embedded device identifications and routing data, the schedule data being used to control monitoring of the plurality of embedded devices.

35. The method of claim 28 further comprising obtaining a device description from computer program code loaded on the embedded device.

36. The method of claim 28 further comprising sending control data to the message store and transmit component, which in turn, send this control data to computer program code loaded on the embedded device, the control data being configured to affect operation of the embedded device, and wherein the periodic sending is based on schedule data.

37. A system for providing services to embedded devices comprising:

one or more service providers for embedded devices, wherein each service provider for embedded devices comprises:

a computer, the computer including communications hardware for communicating over a computer network, the computer also including a storage device;

a database;

a computer network communications module for communicating with computers via the computer network, the computer network communication module being configured to communicate via the computer network with a message store and transmit component, wherein the message store and transmit component communicates with one or more embedded devices through the computer network, and wherein an embedded device is not a desktop computer, wherein the service providers provide information to the one or more embedded devices via a message being sent to the message store and transmit component and another message being sent from the message store and transmit component to the embedded device; and a database interface module for accessing the information in the database; and a central provider in electronic communication with the plurality of service providers for embedded devices, the central provider operating to provide communications between embedded devices and service providers for embedded devices, and to coordinate collecting updated information from the computer network relating to embedded devices, and to coordinate disseminating the updated information to embedded devices, wherein the updated information comprises updated computer program code, wherein the updated computer program code is obtained from a plurality of information providers, wherein the service provider communicates with the plurality of information providers via the computer network, and wherein the service provider sends the updated computer program code to the embedded devices, wherein the updated computer program causes computer program code on the embedded device to be updated, wherein the embedded device does not communicate directly with the information providers.

\* \* \* \* \*

UNITED STATES PATENT AND TRADEMARK OFFICE
CERTIFICATE OF CORRECTION

| | |
|---|---|
| PATENT NO. | : 8,090,811 B2 |
| APPLICATION NO. | : 11/132873 |
| DATED | : January 3, 2012 |
| INVENTOR(S) | : Michael L. Howard |

It is certified that error appears in the above-identified patent and that said Letters Patent is hereby corrected as shown below:

In column 7, line 9 please delete "requester" and replace it with --requestor--.
In column 11, line 34 please delete "modern" and replace it with --modem--.
In column 16, line 9 please delete "modern" and replace it with --modem--.
In column 19, line 40 please delete "requester" and replace it with --requestor--.
In column 19, line 53 please delete "Pew" and replace it with --new--.

Signed and Sealed this
Fifteenth Day of May, 2012

David J. Kappos
*Director of the United States Patent and Trademark Office*